(12) United States Patent
Tokai et al.

(10) Patent No.: US 9,417,748 B2
(45) Date of Patent: Aug. 16, 2016

(54) INPUT DEVICE AND DISPLAY DEVICE

(71) Applicant: Panasonic Intellectual Property Management Co., Ltd., Osaka (JP)

(72) Inventors: Akira Tokai, Hyogo (JP); Hiroyuki Kado, Osaka (JP); Shigeo Kasahara, Hyogo (JP); Naoki Kosugi, Kyoto (JP); Toshiyuki Aoyama, Osaka (JP); Shuji Inoue, Osaka (JP); Kazushige Takagi, Osaka (JP); Manabu Inoue, Osaka (JP); Takahito Nakayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 13 days.

(21) Appl. No.: 14/520,919

(22) Filed: Oct. 22, 2014

(65) Prior Publication Data

US 2015/0109248 A1    Apr. 23, 2015

(30) Foreign Application Priority Data

Oct. 22, 2013   (JP) .................................. 2013-218860
Sep. 9, 2014    (JP) .................................. 2014-182959

(51) Int. Cl.
G06F 3/044        (2006.01)
G06F 3/041        (2006.01)
G09G 3/34         (2006.01)

(52) U.S. Cl.
CPC .............. *G06F 3/044* (2013.01); *G06F 3/0412* (2013.01); *G06F 3/0416* (2013.01); *G09G 3/3406* (2013.01); *G09G 2300/0426* (2013.01)

(58) Field of Classification Search
CPC ....... G06F 3/044; G06F 1/163; G06F 3/0412; G06F 3/0416
See application file for complete search history.

(56) References Cited

U.S. PATENT DOCUMENTS

2008/0079679 A1*  4/2008  Ozawa ................. G09G 3/3659
                                                                345/89
2010/0328268 A1* 12/2010  Teranishi ............... G06F 3/044
                                                                345/175

FOREIGN PATENT DOCUMENTS

JP          2011-138154 A         7/2011

* cited by examiner

*Primary Examiner* — Gerald Johnson
(74) *Attorney, Agent, or Firm* — McDermott Will & Emery LLP

(57) ABSTRACT

An input device which is a capacitive coupling type and can reduce visibility of wiring patterns of electrodes and interference fringes is provided. The input device is included in a display device including a plurality of pixels, and is configured to detect a contact position of a user. The input device includes a plurality of first electrodes, a plurality of second electrodes disposed so as to cross the first electrodes, and a plurality of third electrodes disposed between the second electrodes. Slits extending obliquely with respect to an extension direction of the second electrodes are formed between the third electrodes.

15 Claims, 25 Drawing Sheets

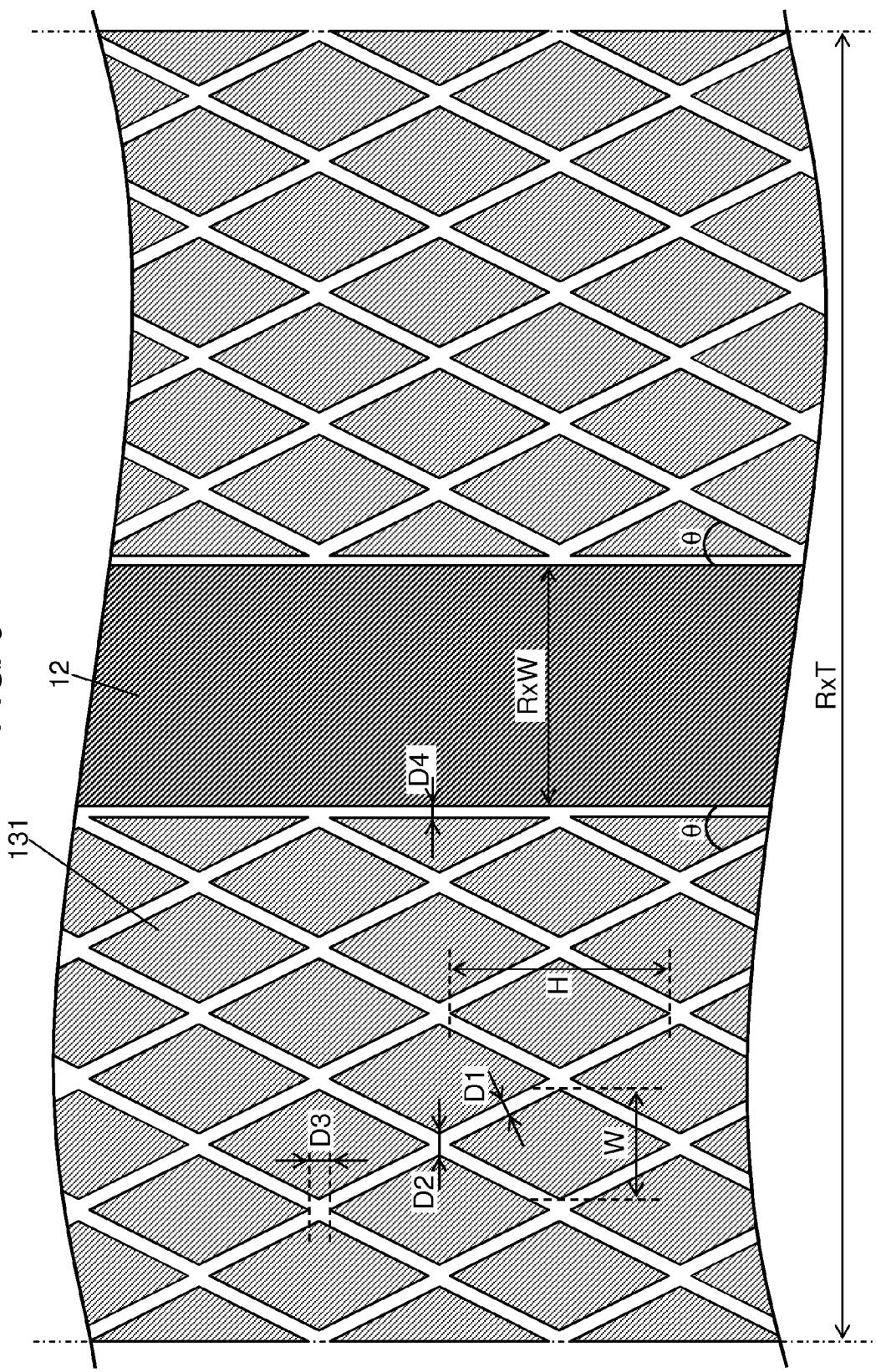

FIG. 10

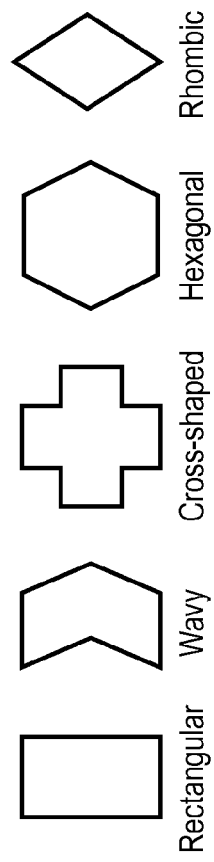

| Shape of floating electrode | | Evaluation test A | | | | Evaluation test B | | | |
|---|---|---|---|---|---|---|---|---|---|
| | | Evaluator A | Evaluator B | Evaluator C | Average | Evaluator A | Evaluator B | Evaluator C | Average |
| Panel No.1 | Rectangular 1×2 | 5 | 4 | 3 | 4.0 | 2 | 3 | 3 | 2.7 |
| Panel No.2 | Rectangular 2×2 | 3 | 2 | 2 | 2.3 | 2 | 2 | 2 | 2.0 |
| Panel No.3 | Rectangular 3×2 | 3 | 4 | 2 | 3.0 | 2 | 2 | 3 | 2.3 |
| Panel No.4 | Rectangular 4×2 | 4 | 4 | 3 | 3.7 | 2 | 2 | 3 | 2.3 |
| Panel No.5 | Rectangular 8×2 | 4 | 4 | 4 | 4.0 | 3 | 2 | 3 | 2.7 |
| Panel No.6 | Wavy 1×2 | 5 | 4 | 3 | 4.0 | 2 | 3 | 2 | 2.3 |
| Panel No.7 | Wavy 2×2 | 3 | 2 | 2 | 2.3 | 1 | 1 | 1 | 1.0 |
| Panel No.8 | Wavy 3×2 | 3 | 3 | 2 | 2.7 | 1 | 1 | 1 | 1.0 |
| Panel No.9 | Wavy 4×2 | 4 | 4 | 3 | 3.7 | 1 | 1 | 1 | 1.0 |
| Panel No.10 | Cross-shaped 4×4 | 4 | 4 | 4 | 4.0 | 2 | 3 | 2 | 2.3 |
| Panel No.11 | Hexagonal 2×2 | 3 | 4 | 3 | 3.3 | 1 | 1 | 3 | 1.7 |
| Panel No.12 | Hexagonal 4×4 | 2 | 4 | 2 | 2.7 | 1 | 1 | 2 | 1.3 |
| Panel No.13 | Rhombic 4×2 | 2 | 1 | 1 | 1.3 | 2 | 1 | 1 | 1.3 |
| Panel No.14 | Rhombic 8×4 | 1 | 1 | 1 | 1.0 | 1 | 1 | 1 | 1.0 |

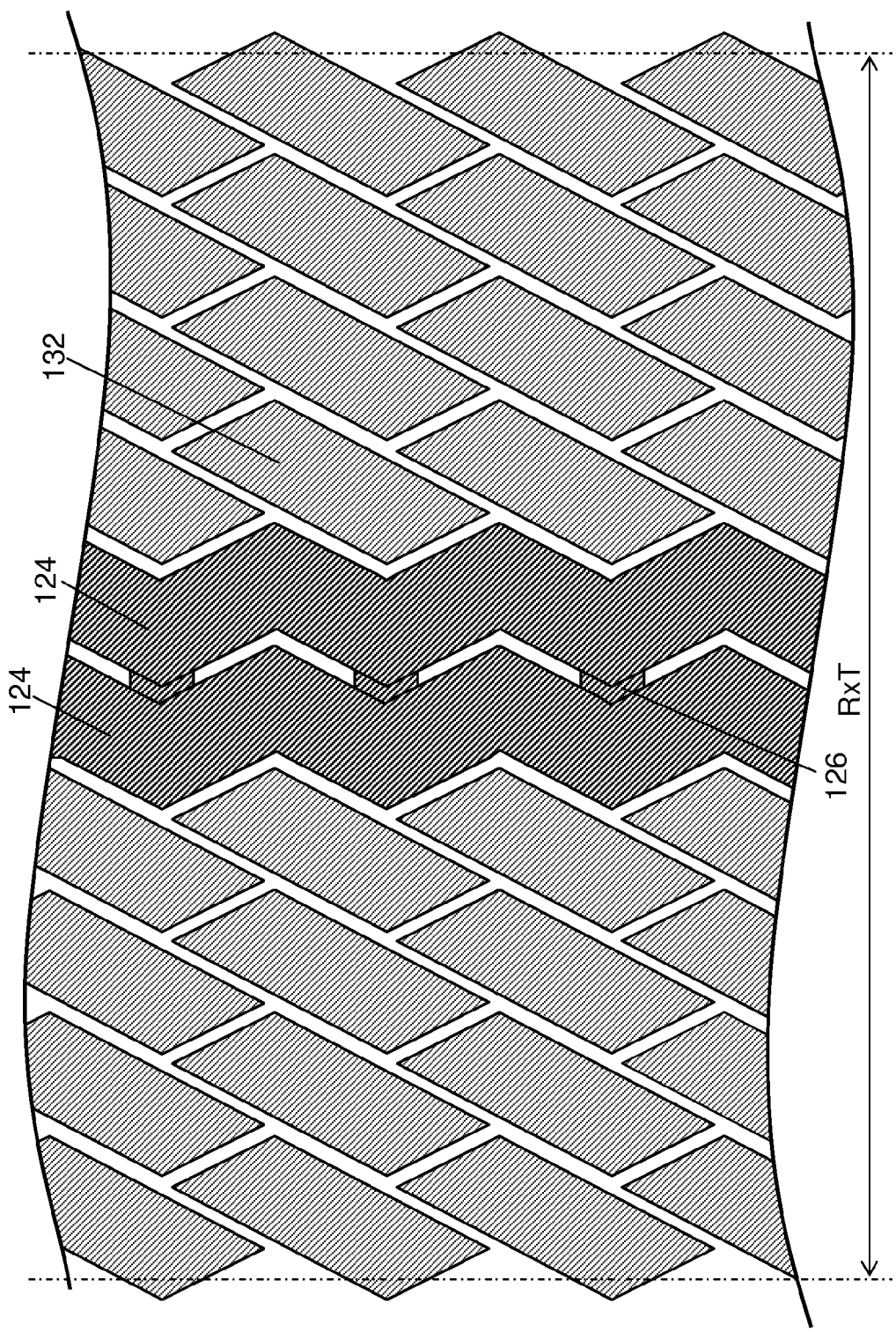

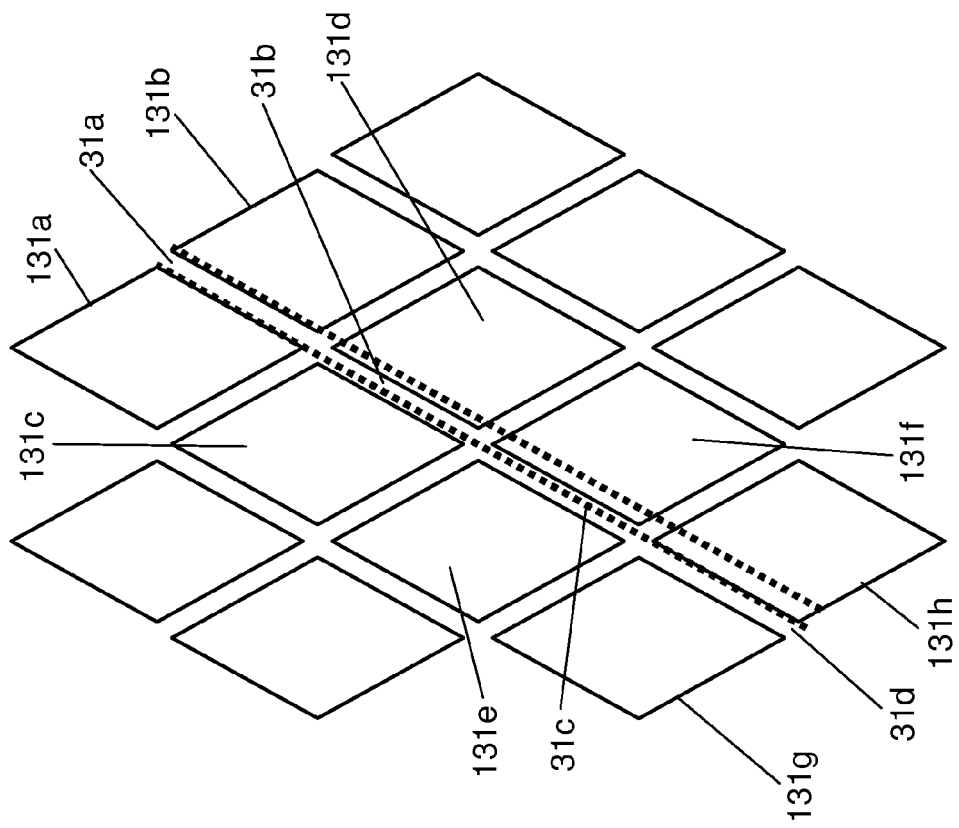
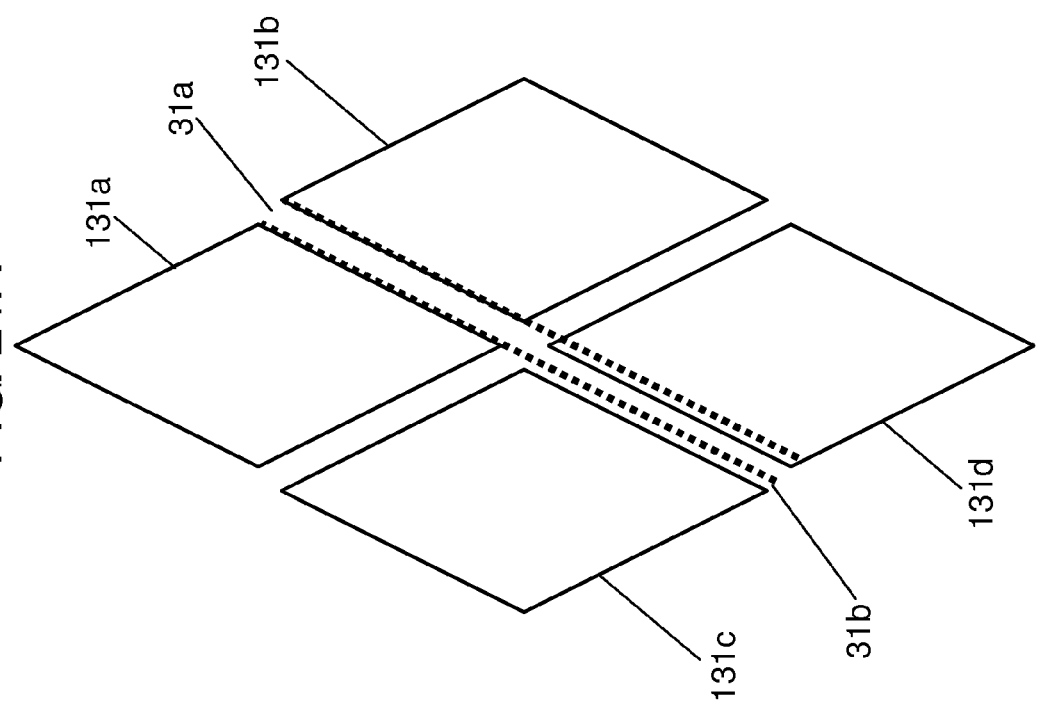

INPUT DEVICE AND DISPLAY DEVICE

BACKGROUND OF THE INVENTION

1. Field of the Invention

The present disclosure relates to an input device which has a capacitive coupling type touch sensor function for allowing coordinates input to a screen, and a display device including this input device.

2. Background Art

There is an input device that has a screen input function for inputting information by allowing, for example, a finger of a user to make contact with a display screen (hereinbelow, referred to as a "touch operation" or merely referred to as "touch"). A display device that is provided with such an input device having a screen input function is used in mobile electronic devices such as a PDA (Personal Digital Assistance) and a mobile terminal, various home electric appliances, and stationary customer guide terminals such as an unattended reception machine and the like. As for such an input device using touch, there are known input devices of various systems such as a resistive film system which detects a change in resistance in a touched part, a capacitive coupling system which detects a change in capacitance, and an optical sensor system which detects a change in an amount of light in a part shielded by touch.

In comparison with the resistive film system and the optical sensor system, the capacitive coupling system has the following advantages. For example, both the resistive film system and the optical sensor system have relatively low light transmittance of approximately 80%. On the other hand, the capacitive coupling system has relatively high light transmittance of approximately 90% at which image quality of a display image is not likely to decrease. In addition, according to the resistive film system which detects a touch position based on a mechanical contact between resistive films, the resistive films may be deteriorated or damaged by the mechanical contact. However, the capacitive coupling system does not require a mechanical contact between detection electrodes and other electrodes or the like, and thus the durability is relatively high.

Unexamined Japanese Patent Publication No. 2011-138154 (PTL 1) discloses this type of capacitive coupling type input device, for example. PTL 1 discloses a structure of floating electrodes disposed apart from each other in an area between detection electrodes, and provided with a natural number multiple pitch of an arrangement pitch of pixel electrodes.

SUMMARY OF THE INVENTION

The present disclosure provides an input device having a capacitive coupling type touch sensor function, allowed to be easily integrated with a display device, and reducing visibility of wiring patterns of electrodes and interference fringes, and further provides a display device including this input device.

An input device according to the present disclosure is provided in a display device including a plurality of pixels, and is configured to detect a contact position of a user. The input device includes a plurality of first electrodes, a plurality of second electrodes disposed so as to cross the first electrodes, and a plurality of third electrodes disposed between the second electrodes. Slits extending obliquely with respect to an extension direction of the second electrodes are formed between the third electrodes.

A display device according to the present disclosure is provided with a display unit including a plurality of pixels, and an input device configured to detect a contact position of a user on the display unit. The input device includes a plurality of first electrodes, a plurality of second electrodes disposed so as to cross the first electrodes, and a plurality of third electrodes disposed between the second electrodes. Slits extending obliquely with respect to an extension direction of the second electrodes are formed between the third electrodes.

An input device and a display device including this input device according to the present disclosure are effective in reducing visibility of wiring patterns of electrodes and interference fringes.

BRIEF DESCRIPTION OF DRAWINGS

FIG. 9 is a plan view schematically illustrating an example of constituent patterns of detection electrodes and floating electrodes of a display device according to the first exemplary embodiment;

FIG. 10 shows summarized results of subjective evaluations carried out by using a plurality of panels prepared for evaluation;

FIG. 20 is a plan view schematically illustrating yet another example of the constituent patterns of the detection electrodes and the floating electrodes of the display device according to the third exemplary embodiment;

FIG. 21A is a plan view schematically illustrating an example of constituent patterns of floating electrodes of a display device according to a fourth exemplary embodiment;

FIG. 21B is a plan view schematically illustrating the example of the constituent patterns of the floating electrodes of the display device according to the fourth exemplary embodiment;

DETAILED DESCRIPTION OF THE INVENTION

Hereinbelow, exemplary embodiments will be specifically described with reference to the drawings in an appropriate manner. However, unnecessarily detailed description may occasionally be omitted. For example, detailed description of already well-known matters and overlapping description of substantially the same configurations may occasionally be omitted. This is to avoid the following description from becoming unnecessarily redundant, and to make it easy for a person skilled in the art to understand the following description.

The accompanying drawings and the following description are provided so that a person skilled in the art can sufficiently understand the present disclosure. Therefore, the accompanying drawings and the following description are not intended to limit the subject matter defined in the claims.

Described in the respective exemplary embodiments are liquid crystal display devices as an example of a display device including an input device. However, the present disclosure is not limited at all to a liquid crystal display device, but may be applied to a display device other than of a liquid crystal type, such as an EL (Electronic Luminescent) display device.

First Exemplary Embodiment

Hereinbelow, a first exemplary embodiment will be described with reference to FIG. 1 to FIG. 14.

[1-1. Configuration]

Figure 1:
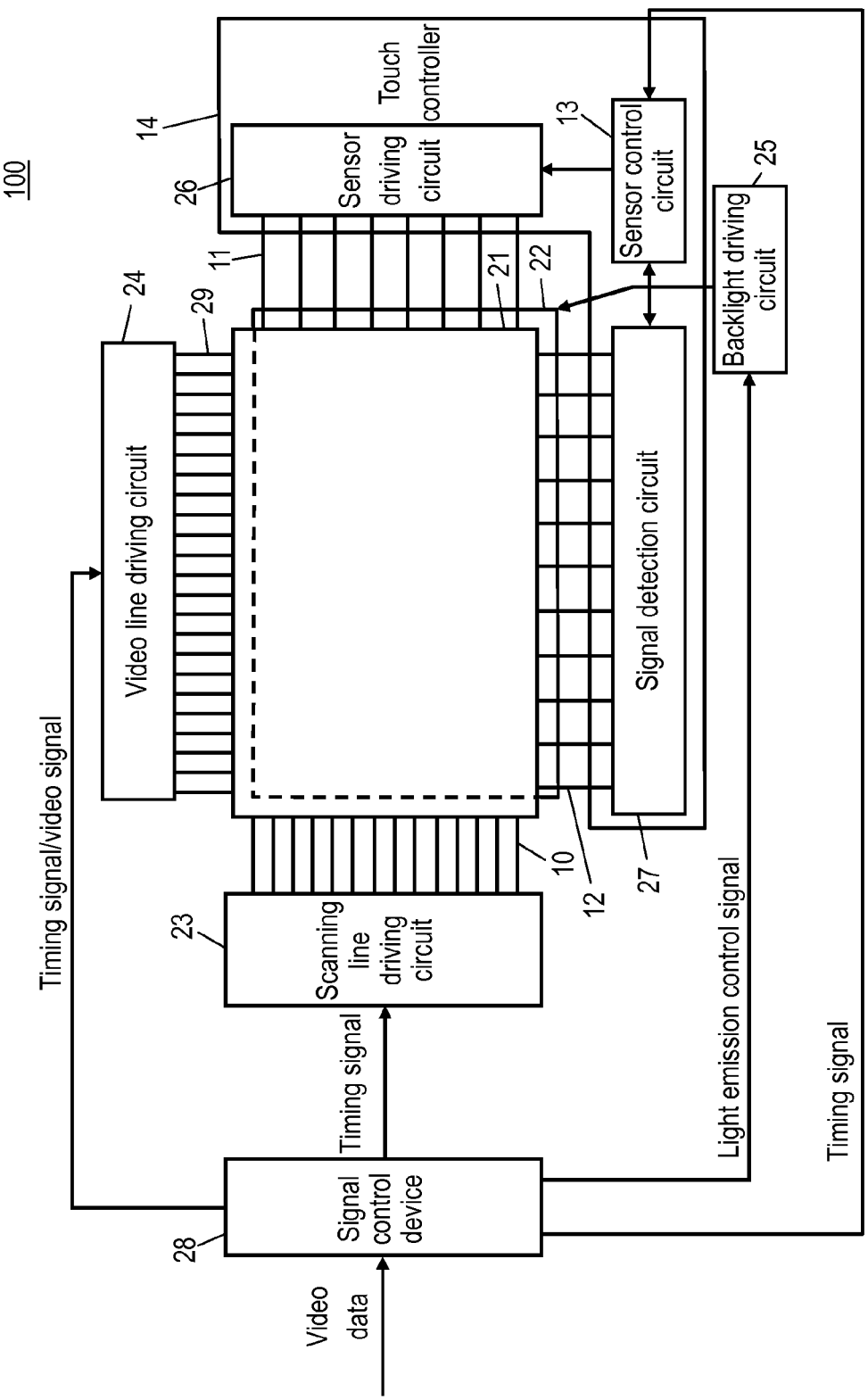
FIG. 1 is a block diagram illustrating an entire configuration of a display device having a touch sensor function in a first exemplary embodiment.

FIG. 1 is a block diagram illustrating an entire configuration of display device 100 having a touch sensor function in the first exemplary embodiment.

As illustrated in FIG. 1, display device 100 is provided with liquid crystal panel 21, backlight unit 22, scanning line driving circuit 23, video line driving circuit 24, backlight driving circuit 25, signal control device 28, and touch controller 14. Touch controller 14 is provided with sensor control circuit 13, sensor driving circuit 26, and signal detection circuit 27.

In liquid crystal panel 21, a pixel is constituted by sub pixels in a plurality of colors different from each other (such as three colors of red, green, and blue). A plurality of these pixels are arranged in matrix to form a display unit.

In the present exemplary embodiment and the subsequent exemplary embodiments, the input device includes driving electrodes 11, detection electrodes 12, and touch controller 14. Therefore, the input device described in the present exemplary embodiment is provided in display device 100 and integrated with display device 100. Hereinbelow, the input device is also referred to as a touch sensor or a touch panel. Further, a position with which, for example, a finger of a user makes contact in the input device is also referred to as a contact position or a touch position. The input device is configured to detect the contact position of the user on the display unit of liquid crystal panel 21. The input device may be formed integrally with liquid crystal panel 21, or separately manufactured as an input device and combined with liquid crystal panel 21 into one body.

Liquid crystal panel 21 is formed in a rectangular flat-plate shape and includes a TFT (thin film transistor) substrate which is composed of a transparent substrate such as a glass substrate, a counter substrate which is disposed to face the TFT substrate with a predetermined space from the TFT substrate, and a liquid crystal material which is enclosed between the TFT substrate and the counter substrate.

The TFT substrate is located on a back side (backlight side) of liquid crystal panel 21. In the TFT substrate, pixel electrodes which are arranged in matrix, thin film transistors (TFTs) as switching elements which are provided corresponding to the pixel electrodes and on/off control voltage application to the pixel electrodes, a common electrode, and the like are formed on the substrate which constitutes the TFT substrate.

The counter substrate is located on a front side (display surface side) of liquid crystal panel 21. In the counter substrate, a color filter (CF), a black matrix (BM), and the like are formed on the transparent substrate which constitutes the counter substrate. The CF includes at least three primary colors of red (R), green (G), and blue (B) and is located corresponding to the pixel electrodes. The BM is arranged between sub-pixels of the RGB and/or between pixels composed of the sub-pixels, is used for improving contrast, and is made of a light-shielding material. In the present exemplary embodiment, the TFTs each of which is formed in each sub-pixel on the TFT substrate are n-channel TFTs. A configuration will be described by defining a drain electrode and a source electrode. However, the described TFTs are merely an example, and the TFTs are not limited at all to n-channel type TFTs.

A plurality of video signal lines 29 and a plurality of scanning signal lines 10 are formed on the TFT substrate so as to be substantially perpendicular to each other. Each of scanning signal lines 10 is provided for each of horizontal rows of the TFTs and is connected to gate electrodes of plural ones of the TFTs in the horizontal row in common. Each of video signal lines 29 is provided for each of vertical columns of the TFTs and is connected to drain electrodes of plural ones of the TFTs in the vertical columns in common. Further, each of the TFTs has a source electrode to which a pixel electrode that is arranged in a pixel area corresponding to the TFT is connected.

In the present exemplary embodiment, a direction that is parallel to a long side of liquid crystal panel 21 is defined as the horizontal direction and a direction that is parallel to a short side of liquid crystal panel 21 is defined as the vertical direction.

On/off operations of the respective TFTs formed on the TFT substrate are controlled in a unit of horizontal row in response to scanning signals applied to scanning signal lines 10. In each TFT in a horizontal row that is turned to an on state, a pixel electrode is set to a potential (pixel voltage) corresponding to a video signal applied to corresponding video signal line 29. Liquid crystal panel 21 includes the plurality of pixel electrodes and the common electrode which is provided to face the pixel electrodes. Liquid crystal panel 21 controls orientation of liquid crystal in each pixel area by electric fields generated between the pixel electrodes and the common electrode to change transmittance with respect to light entered from backlight unit 22 to thereby form an image on a display surface.

Backlight unit 22 is disposed on the back side of liquid crystal panel 21 and applies light from a back face of liquid crystal panel 21. As for backlight unit 22, there are known, for example, a backlight unit having a structure in which a plurality of light emitting diodes are arrayed to configure a surface light source and a backlight unit having a structure in which a surface light source is configured by using light from a light emitting diode in combination with a light-guiding plate and a diffuse reflection plate.

Scanning line driving circuit 23 is connected to scanning signal lines 10 formed on the TFT substrate. Scanning line driving circuit 23 selects scanning signal lines 10 in order in response to timing signals 1, 2 input from signal control device 28, and applies voltage for turning on TFTs to selected scanning signal line 10. For example, scanning line driving circuit 23 includes a shift register. The shift register starts an operation upon receiving trigger signals (timing signals 1, 2) from signal control device 28. Then, scanning line driving circuit 23 sequentially selects scanning signal lines 10 in order along a vertical scanning direction, and applies a scanning pulse to selected scanning signal line 10.

Video line driving circuit 24 is connected to video signal lines 29 formed on the TFT substrate. In accordance with the selection of scanning signal lines 10 performed by scanning line driving circuit 23, video line driving circuit 24 applies voltage that corresponds to a video signal indicating a gradation value of each sub-pixel to each TFT that is connected to selected scanning signal line 10. As a result, the video signal is written in sub-pixels that correspond to selected scanning signal line 10.

Backlight driving circuit 25 allows backlight unit 22 to emit light at timing and luminance both corresponding to a light emission control signal input from signal control device 28.

A plurality of driving electrodes 11 and a plurality of detection electrodes 12, both constituting a touch sensor, are arranged on liquid crystal panel 21 in such positions as to cross each other. Driving electrodes 11 correspond to first electrodes in the appended claims, while detection electrodes 12 correspond to second electrodes in the appended claims. Driving electrodes 11 as the first electrodes and detection electrodes 12 as the second electrodes are capacitively coupled to each other.

The touch sensor that includes driving electrodes 11 and detection electrodes 12 performs, between driving electrodes 11 and detection electrodes 12, response detection (detection of a change in voltage) based on input of an electric signal and a change in capacitance to thereby detect contact of an object (a finger of a user, for example) with the display surface. Sensor driving circuit 26 and signal detection circuit 27 are provided as electric circuits that detect the contact.

Sensor driving circuit 26 is an alternating current (AC) signal source, and is connected to driving electrodes 11. For example, when a sensor signal corresponding to a timing signal is input to sensor driving circuit 26 from sensor control circuit 13, sensor driving circuit 26 sequentially selects driving electrodes 11 in the order corresponding to the vertical scanning direction in synchronization with image display by liquid crystal panel 21, and applies driving signal Txv of rectangular pulse voltage to selected driving electrodes 11. For example, sensor driving circuit 26 includes a shift register similarly to scanning line driving circuit 23. The shift register starts operation when receiving a trigger signal (sensor signal) from sensor control circuit 13. Then, sensor driving circuit 26 sequentially selects driving electrodes 11 in the order corresponding to the vertical scanning direction, and applies touch driving signal Txv of pulse voltage to selected driving electrodes 11.

Driving electrodes 11 and scanning signal lines 10 are formed to extend in the horizontal direction (row direction) and arrayed side by side in the vertical direction (column direction) on the TFT substrate. Desirably, sensor driving circuit 26 electrically connected to driving electrodes 11 and scanning line driving circuit 23 electrically connected to scanning signal lines 10 are disposed along vertical sides of a display area in which sub-pixels are arrayed. FIG. 1 illustrates an example in which scanning line driving circuit 23 and sensor driving circuit 26 are disposed on one and the other of the left and right sides, respectively. Alternatively, both scanning line driving circuit 23 and sensor driving circuit 26 may be disposed on one of the left and right sides, or may be drawn toward the other side via wires or the like around liquid crystal panel 21.

Signal detection circuit 27 is provided with a plurality of detection circuits which detect a change in capacitance and is connected to detection electrodes 12. Signal detection circuit 27 includes the detection circuits provided for the respective detection electrodes 12 and is configured to detect detection signals Rxv from detection electrodes 12.

The contact position of an object on the display surface is obtained in sensor control circuit 13 based on in which detection electrode 12 a signal at the time of the contact is detected and to which driving electrode 11 touch driving signal Txv is applied at the time of the contact. In sensor control circuit 13, an intersection point between decided driving electrode 11 and decided detection electrode 12 is obtained as the contact position. The contact position may be calculated by using an arithmetic circuit provided within display device 100 to calculate the contact position, or may be calculated by using an arithmetic circuit provided outside display device 100 to calculate the contact position, for example.

Signal control device 28 is provided with an arithmetic processing circuit such as a CPU and a memory such as a ROM and/or a RAM. Signal control device 28 performs various kinds of video signal processing such as color adjustment based on video data input to signal control device 28 to thereby generate an video signal that indicates gradation of each sub-pixel and supplies the generated video signal to video line driving circuit 24. Signal control device 28 generates timing signals for synchronizing operations of scanning line driving circuit 23, video line driving circuit 24, backlight driving circuit 25, sensor control circuit 13 based on the video data input to signal control device 28 and supplies the generated timing signals to these circuits. Signal control device 28 supplies, as the light emission control signal to backlight driving circuit 25, a luminance signal for controlling luminance of a backlight (a light emitting diode, for example) to backlight driving circuit 25 based on the input video data.

Sensor control circuit 13 controls sensor driving circuit 26 and signal detection circuit 27 in response to the timing signals input from signal control device 28.

Scanning line driving circuit 23, video line driving circuit 24, sensor driving circuit 26, sensor control circuit 13, and signal detection circuit 27 which are connected to the signal lines and the electrodes of liquid crystal panel 21 are each configured in such a manner that a semiconductor chip of each of the circuits is mounted on a flexible wiring board, a printed wiring board, or a glass substrate. However, scanning line driving circuit 23, video line driving circuit 24, sensor driving circuit 26, and sensor control circuit 13 may be mounted on the TFT substrate by being simultaneously formed with the TFTs and the like.

Touch controller 14 is provided with sensor driving circuit 26, signal detection circuit 27, and sensor control circuit 13. Touch controller 14 controls the touch sensor based on timing signals input from signal control device 28. Sensor driving circuit 26, signal detection circuit 27, and sensor control circuit 13 may be separate semiconductors or may also be integrated as a single semiconductor as a whole.

Figure 2:
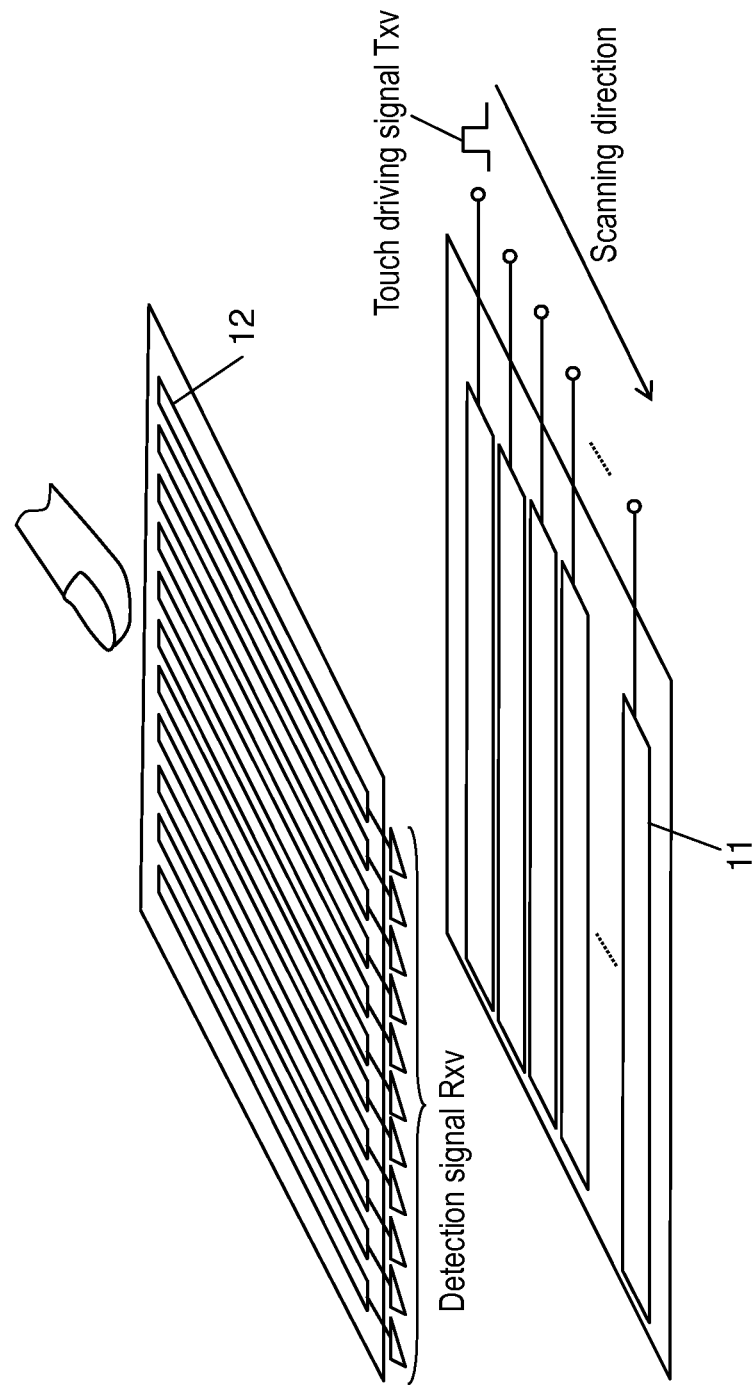
FIG. 2 is a perspective view illustrating an example of array of driving electrodes and detection electrodes included in a touch sensor in the first exemplary embodiment.

FIG. 2 is a perspective view illustrating an example of array of the driving electrodes and the detection electrodes included in the touch sensor in the first exemplary embodiment. As illustrated in FIG. 2, the touch sensor as the input device includes driving electrodes 11 and detection electrodes 12. Driving electrodes 11 are a plurality of striped electrode patterns extending in a right-left direction of FIG. 2. Detection electrodes 12 are a plurality of substantially striped electrode patterns extending in a direction that intersects the extending direction of the electrode patterns of driving electrodes 11. Driving electrodes 11 and detection electrodes 12 intersect each other to form intersection parts, and a capacitative element having capacitance is formed in each of the intersection parts.

Driving electrodes 11 are arrayed to extend in a direction parallel to an extending direction of scanning signal lines 10. As will be described in detail below, when M scanning signal lines 10 (M is a natural number) that are adjacent to each other are defined as one line block, each of driving electrodes 11 is disposed corresponding to each of N line blocks (N is a natural number), and a touch driving signal is applied to each of the line blocks.

During a touch detection operation, touch driving signal Txv is applied from sensor driving circuit 26 to each of driving electrodes 11 so as to perform sequential scanning in a time division manner for each of the line blocks. As a result, one line block to be a detection target is sequentially selected. Further, when signal detection circuit 27 receives detection signal Rxv from detection electrode 12, touch detection in one line block is performed.

Next, a principle of touch detection (voltage detection system) in a capacitance type touch sensor will be described with reference to FIG. 3 and FIG. 4.

Figure 3A:
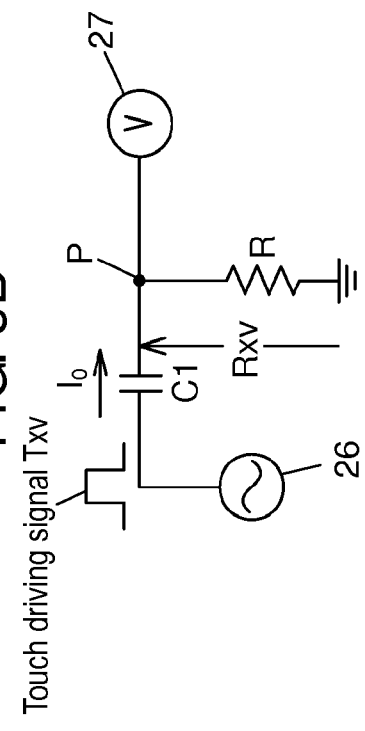
FIG. 3A is a diagram schematically illustrating a configuration of the touch sensor in the first exemplary embodiment.
Figure 3B:
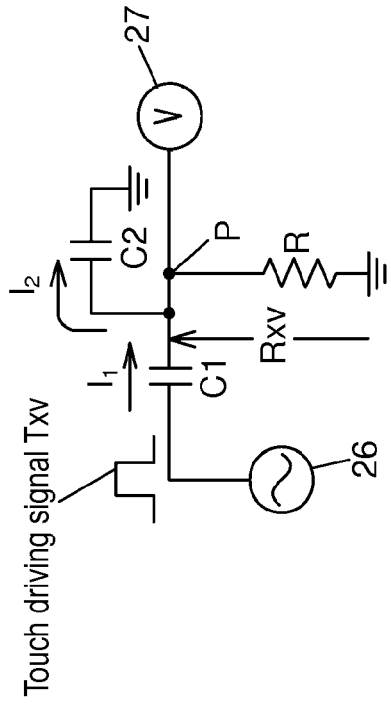
FIG. 3B is a diagram illustrating an equivalent circuit of FIG. 3A.
Figure 3C:
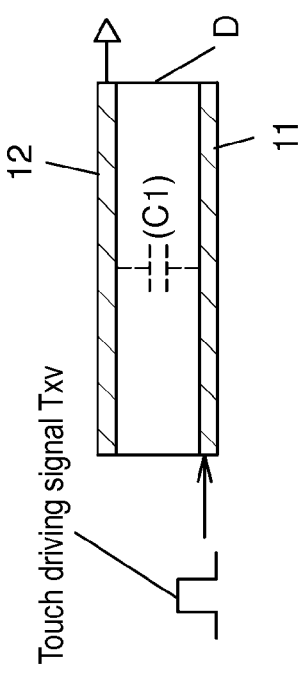
FIG. 3C is a schematic view illustrating a state in which a touch operation is performed on the touch sensor of FIG. 3A.
Figure 3D:
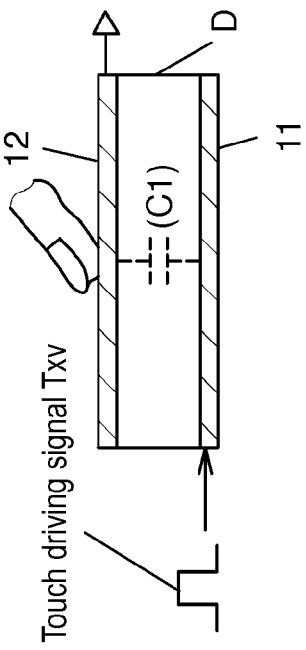
FIG. 3D is a diagram illustrating an equivalent circuit of FIG. 3C.

FIG. 3A is a diagram schematically illustrating a configuration of the touch sensor in the first exemplary embodiment. FIG. 3B is a diagram illustrating an equivalent circuit of FIG. 3A. FIG. 3C is a schematic view illustrating a state in which a touch operation is performed on the touch sensor of FIG. 3A. FIG. 3D is a diagram illustrating an equivalent circuit of FIG. 3C.

Figure 4:
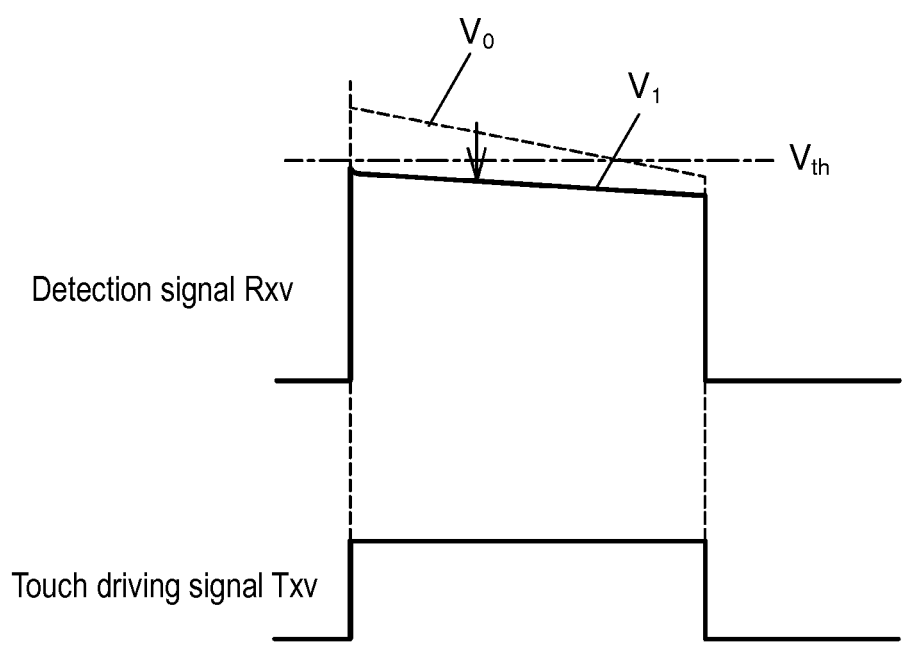
FIG. 4 is a waveform diagram illustrating a change in a detection signal between when a touch operation is not performed on the touch sensor illustrated in FIG. 3A and when a touch operation is performed on the touch sensor illustrated in FIG. 3A.

FIG. 4 is a waveform diagram illustrating a change in a detection signal between when a touch operation is not performed on the touch sensor illustrated in FIG. 3A and when a touch operation is performed on the touch sensor illustrated in FIG. 3A.

In the capacitance type touch sensor, driving electrodes 11 and detection electrodes 12 which are arranged in matrix to intersect each other as illustrated in FIG. 2 face each other with dielectric D interposed between driving electrodes 11 and detection electrodes 12 as illustrated in FIG. 3A. As a result, the capacitative element is formed in each of the intersection parts between driving electrodes 11 and detection electrodes 12. The equivalent circuit is represented as illustrated in FIG. 3B. Capacitative element C1 includes driving electrode 11, detection electrode 12, and dielectric D. Capacitative element C1 has one end that is connected to sensor driving circuit 26 as the AC signal source and the other end P that is grounded via resistor R and connected to signal detection circuit 27 as a voltage detector.

When touch driving signal Txv (FIG. 4) having a pulse voltage waveform and a frequency of approximately several tens kHz to several hundred kHz (a predetermined frequency) is applied to driving electrode 11 (one end of capacitative element C1) from sensor driving circuit 26 as the AC signal source, an output waveform (detection signal Rxv) as illustrated in FIG. 4 appears in detection electrode 12 (the other end P of capacitative element C1).

When a finger is not in contact with (or not in close to) the display screen, current I0 that corresponds to a capacitance value of capacitative element C1 flows accompanied with charge/discharge to capacitative element C1 as illustrated in FIG. 3B. A voltage waveform at the other end P of capacitative element C1 is formed in waveform V0 of FIG. 4 and detected by signal detection circuit 27 as the voltage detector.

On the other hand, when a finger is in contact with (or in close to) the display screen, capacitative element C2 formed by the finger is added in series to capacitative element C1 in the equivalent circuit as illustrated in FIG. 3D. In this state, current I1 and current I2 flow respectively accompanied with charge/discharge to capacitative element C1 and capacitative element C2. The voltage waveform at the other end P of capacitative element C1 at this point is formed in waveform V1 of FIG. 4 and detected by signal detection circuit 27 as the voltage detector. A voltage potential at point P at this point is a divided voltage potential that is determined by values of current I1 and current I2 respectively flowing in capacitative element C1 and capacitative element C2. Therefore, waveform V1 has a lower voltage value than waveform V0 in the non-contact state.

Signal detection circuit 27 compares a voltage potential of detection signal Rxv output from each of detection electrodes 12 with predetermined threshold voltage Vth. When detection signal Rxv is threshold voltage Vth or more, signal detection circuit 27 determines the non-contact state. On the other hand, when detection signal Rxv is less than threshold voltage Vth, signal detection circuit 27 determines the contact state. In this manner, the touch detection can be performed. In the present exemplary embodiment, the touch detection is not limited at all to voltage detection. As for a method for detecting a change in capacitance other than voltage detection, for example, there is a method that detects current.

[1-2. Operation]

Next, an example of a method for driving the touch sensor in the present exemplary embodiment will be described with reference to FIG. 5 to FIG. 8.

Figure 5:
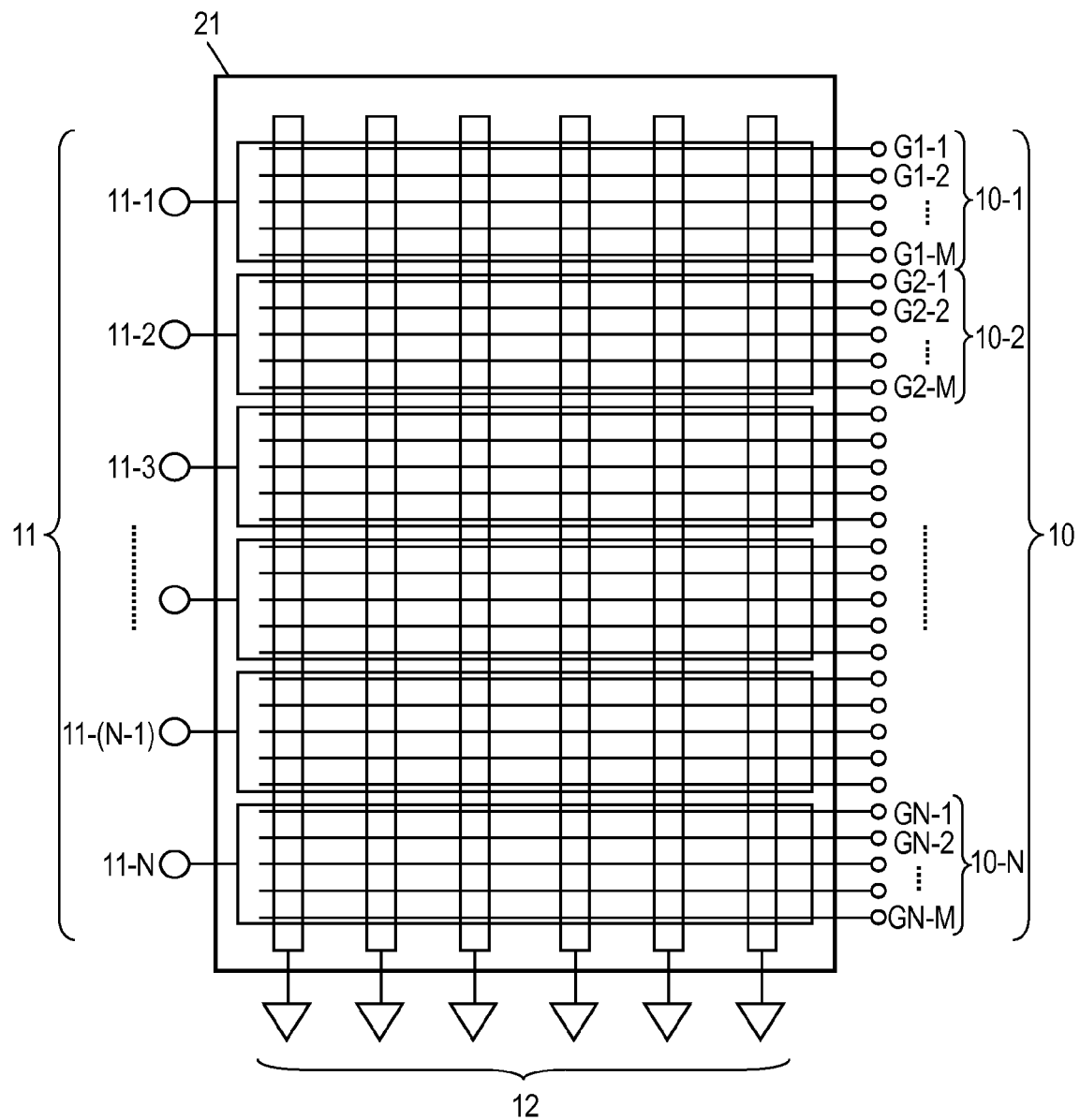
FIG. 5 is a schematic view illustrating array structure of scanning signal lines of a liquid crystal panel and array structure of driving electrodes and detection electrodes of the touch sensor in the first exemplary embodiment.

FIG. 5 is a schematic view illustrating array structure of scanning signal lines 10 of liquid crystal panel 21 and array structure of driving electrodes 11 and detection electrodes 12 of the touch sensor in the first exemplary embodiment. As illustrated in FIG. 5, X scanning signal lines 10 which extend in the horizontal direction are arrayed by being divided into N line blocks 10-1, 10-2, ..., 10-N (N is a natural number), wherein each of the N line blocks includes M scanning signal lines 10 (M is a natural number) that are adjacent to each other (for example, scanning signal lines G1-1, G1-2, ..., G1-M).

In FIG. 5 and the subsequent figures, each of scanning signal lines 10 is also referred to as "scanning signal line Ga-b", where "a" indicates that the scanning signal line 10 is included in an a-th line block from the top and "b" indicates that the scanning signal line 10 is disposed in a b-th position in the line block. That is, "scanning signal line Ga-b" indicates scanning signal line 10 that is located in the b-th position in line block 10-a. Further, N×M is equal to total number X of scanning signal lines 10.

Driving electrodes 11 of the touch sensor are arrayed in such a manner that N driving electrodes 11-1, 11-2, ..., 11-N extend in the horizontal direction so as to correspond to line blocks 10-1, 10-2, ..., 10-N. A plurality of detection electrodes 12 are arrayed to extend in the vertical direction so as to intersect N driving electrodes 11-1, 11-2, ..., 11-N.

Figure 6:
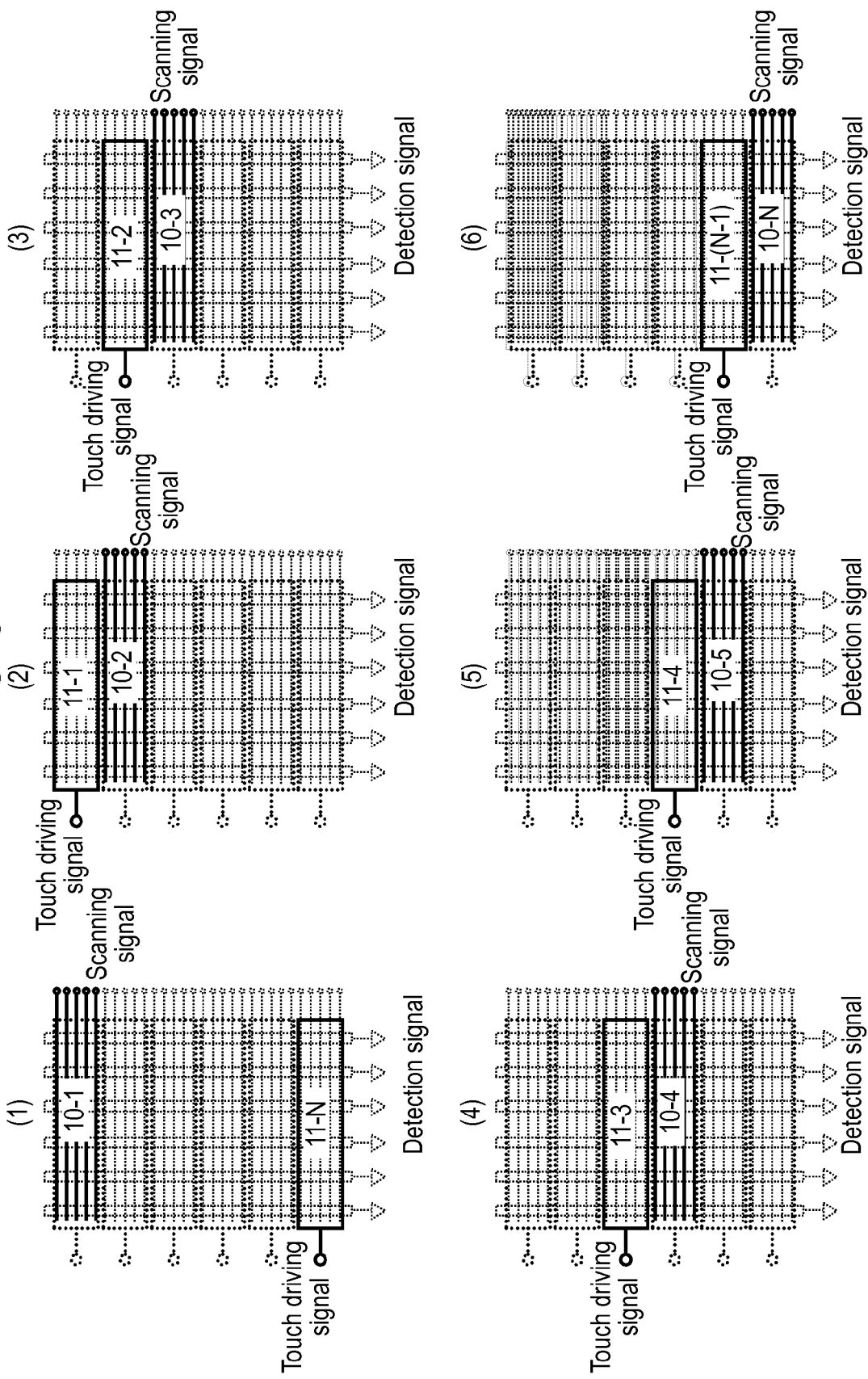
FIG. 6 is a diagram schematically illustrating a relationship between input of scanning signals to the scanning signal lines and input of touch driving signals to the driving electrodes in the first exemplary embodiment.

FIG. 6 is a diagram schematically illustrating a relationship between input of scanning signals to scanning signal lines 10 and input of touch driving signals to driving electrodes 11 in the first exemplary embodiment. The scanning signals are sequentially applied to the respective scanning signal lines 10 in order to perform update of a display image (hereinbelow, referred to as "display update") in liquid crystal panel 21. The touch driving signals are sequentially applied to the respective driving electrodes 11 in order to perform the touch detection in the touch sensor. In the present exemplary embodiment and the subsequent exemplary embodiments, time required to apply scanning signals to all scanning signal lines 10 that constitute one line block is referred to as "a one-line block scanning period". In FIG. 6, time passes from (1) to (6). Each of (1) to (6) of FIG. 6 illustrates a state in the one-line block scanning period.

In the exemplary embodiment, as illustrated in (1) of FIG. 6, in a line block scanning period during which scanning signals are sequentially applied to scanning signal lines G1-1 to G1-M that constitute line block 10-1 located on the top, a touch driving signal is applied to driving electrode 11-N that corresponds to line block 10-N located on the bottom. In the subsequent line block scanning period, as illustrated in (2) of FIG. 6, scanning signals are sequentially applied to scanning signal lines G2-1 to G2-M that constitute the second line block 10-2 from the top. In this line block scanning period, a touch driving signal is applied to driving electrode 11-1 that corresponds to line block 10-1 to which the scanning signals have been applied in the preceding line block scanning period.

As illustrated in (3) to (6) of FIG. 6, scanning signals are sequentially applied to scanning signal lines G3-1 to GN-M that constitute line blocks 10-3, 10-4, 10-5, ..., 10-N, so that line block scanning periods sequentially progress. On the other hand, in each of the line block scanning periods, touch driving signals are sequentially applied to driving electrodes 11-2, 11-3, 11-4, ..., 11-(N−1) that correspond to line blocks 10-2, 10-3, 10-4, ..., 10-(N−1) to which scanning signals have been applied in the preceding line block scanning periods. In the present exemplary embodiment, order of applying scanning signals to scanning signal lines 10 and order of applying touch driving signals to driving electrodes 11 are configured in this manner.

Specifically, in the present exemplary embodiment, when a touch driving signal is applied to each of driving electrodes 11, driving electrode 11 that corresponds to a line block that differs from a line block to which scanning signal lines 10 to which scanning signals are applied belong is selected, and a touch driving signal is applied to selected driving electrode 11 in each of the line block scanning periods.

In FIG. 6, there has been described the example in which a touch driving signal is applied to driving electrode 11 that corresponds to a line block to which scanning signals have been applied in the preceding line block scanning period. However, the present exemplary embodiment is not limited at all to this configuration. In the present exemplary embodiment, it is only required to prevent a touch driving signal from being applied to driving electrode 11 that corresponds to a line block to which scanning signals are applied. For example, one or two or more line blocks may be interposed between a line block to which scanning signals are applied and driving electrode 11 to which a touch driving signal is applied.

Figure 7:
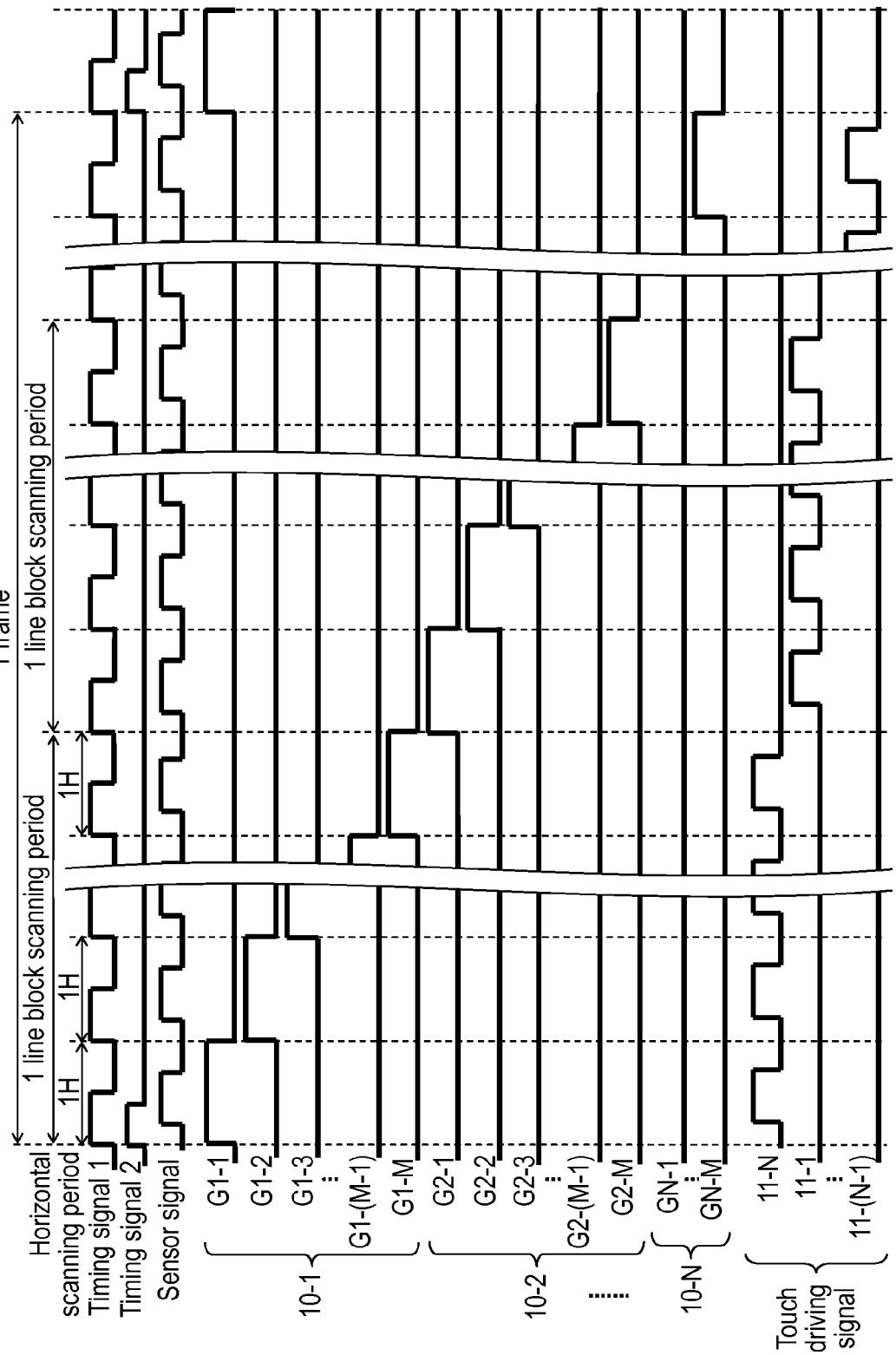
FIG. 7 is a timing chart of scanning signals and touch driving signals in one frame period in the first exemplary embodiment.

FIG. 7 is a timing chart of scanning signals and touch driving signals in one frame period in the first exemplary embodiment. FIG. 7 illustrates the timing chart based on the example illustrated in FIG. 6.

As illustrated in FIG. 7, scanning signals are sequentially applied to scanning signal lines 10 in such order as line block 10-1, 10-2, ..., 10-N (in such order as scanning signal line G1-1, G1-2, ..., GN-M in the example illustrated in FIG. 7) in each horizontal scanning period (1H) in one frame period to perform the display update. Within the period during which the scanning signals are applied, touch driving signals for the touch detection are sequentially applied to driving electrodes 11-N, 11-1, 11-2, ..., 11-(N−1) that respectively correspond to line blocks 10-N, 10-1, 10-2, ..., 10-(N−1) in a unit of line block scanning period.

First and second timing signals are generated by signal control device 28 for an operation of liquid crystal panel 21. In FIG. 7, timing signal 1 as the first timing signal represents timing of generating each scanning signal, and timing signal 2 as the second timing signal represents generation start timing of the first scanning signal in one frame period. Timing signal 1 is generated substantially at every horizontal scanning period (every M. Timing signal 2 is generated once in one frame period. In the example of FIG. 7, there is illustrated a case in which scanning is started from line block 10-1.

Sensor signal is generated for an operation of sensor driving circuit 26. Sensor control circuit 13 generates the sensor signal based on timing signals 1, 2 input from signal control device 28. Sensor driving circuit 26 applies touch driving signals to driving electrodes 11 based on the sensor signal generated by sensor control circuit 13. As illustrated in FIG. 7, the sensor signal is synchronized with the scanning signals.

Figure 8:
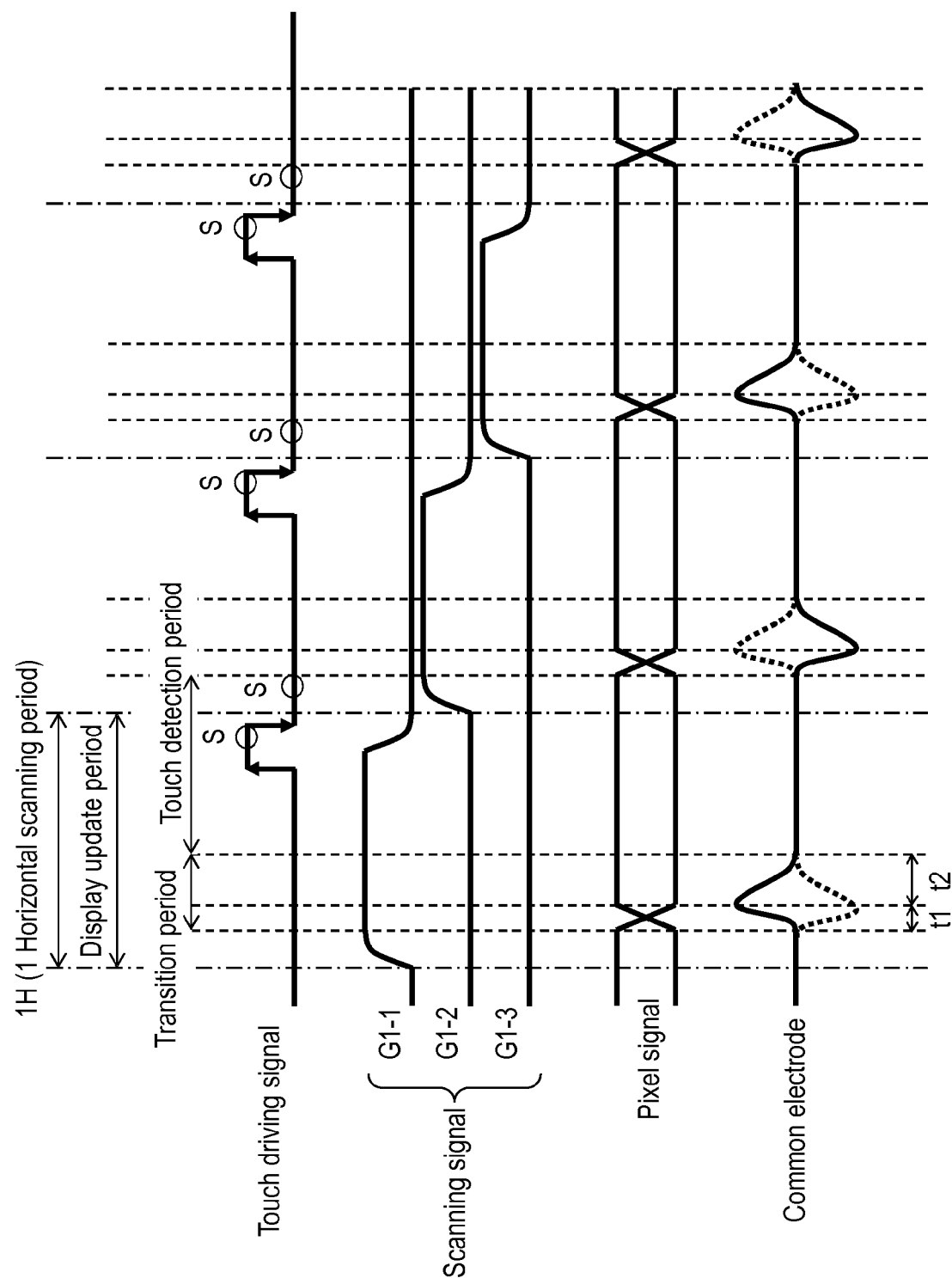
FIG. 8 is a timing chart illustrating an example of a relationship between a display update period and a touch detection period in one horizontal scanning period in the first exemplary embodiment.

FIG. 8 is a timing chart illustrating an example of a relationship between a display update period and a touch detection period in one horizontal scanning period in the first exemplary embodiment.

As illustrated in FIG. 8, in each display update period, a scanning signal is sequentially applied to each of scanning signal lines 10, and a pixel signal corresponding to an input video signal is input to each of video signal lines 29 which are connected to switching elements of the respective pixel electrodes of the respective sub-pixels.

In the present exemplary embodiment, the touch detection period is provided at timing based on the display update period. The touch detection period is defined as a period obtained by subtracting a transition period from the display update period. That is, a pulse voltage as the touch driving signal is applied to each of driving electrodes 11 when a scanning signal rises to a predetermined potential and voltage displacement in each of the electrodes is converged. The touch detection period is started from a displacement point of the potential caused by the rising of the pulse voltage. Further, touch detection timing S exists at two positions, specifically, a position immediately before a falling point of the pulse voltage and a position at a touch detection period finishing point. The transition period includes period t1 during which a pixel signal is displaced and period t1+t2 during which a potential of the common electrode is displaced and converged accompanied with displacement of the pixel signal. This is because of that variations in the potential of the common electrode occur in transition period t1 of the pixel signal because of parasitic capacitance coupling inside the panel. Period t1 and period t2 are set for preventing the variations from occurring during the touch detection period.

An example of the touch detection timing is illustrated in FIG. 8. However, the touch detection timing is not limited to the timing illustrated in FIG. 8, and is desirably set so as to avoid a period during which noise is generated in display device 100 because of a display update operation.

The touch detection operation during the touch detection period is as described above with reference to FIG. 3 and FIG. 4.

The description herein with reference to FIG. 1 and FIGS. 6 through 8 is based upon the assumption that the touch panel is an in-cell touch panel. However, the touch panel described in the respective exemplary embodiments is not limited to an in-cell type, but may be an out-cell touch panel. In the case of the out-cell touch panel, scanning line driving circuit 23 and sensor driving circuit 26 are not required to be synchronous with each other during operation.

[1-3. Structure]

An electrode structure of the touch sensor according to the present exemplary embodiment is hereinafter described with reference to FIGS. 9 through 13.

As illustrated in FIG. 2, detection electrodes 12 according to the present exemplary embodiment are formed of substantially stripe-shaped wiring patterns. Respective detection electrodes 12 are provided on liquid crystal panel 21 at predetermined intervals while spaced away from each other. The intervals of detection electrodes 12 are determined based on the specified degree of detection sensitivity (resolution in the horizontal direction) for touch detection. According to the present exemplary embodiment, a plurality of floating electrodes having predetermined shapes are provided between respective detection electrodes 12. The floating electrodes correspond to third electrodes according to the appended claims. In addition, slits are formed between the floating electrodes. These slits extend obliquely with respect to an extension direction of detection electrodes 12.

Each of the plan views illustrating the respective floating electrodes in the present exemplary embodiment and the following exemplary embodiments schematically shows one cycle (expressed as R×T in the figures) of the detection electrodes disposed substantially in the shape of stripes in the horizontal direction. The patterns, which are illustrated in the respective figures, of the detection electrodes and the floating electrodes disposed on liquid crystal panel 21 are repeated in the horizontal direction. While only a part of the patterns in the vertical direction are extracted and shown, the patterns illustrated in the respective figures are repeated in the vertical direction similarly to those in the horizontal direction.

FIG. 9 is a plan view schematically illustrating an example of constituent patterns of detection electrodes 12 and floating electrodes 131 of display device 100 according to the first exemplary embodiment.

As illustrated in FIG. 9, substantially stripe-shaped detection electrodes 12 are provided on liquid crystal panel 21 at predetermined intervals while spaced away from each other. According to the present exemplary embodiment, a plurality of rhombic floating electrodes 131 are provided between detection electrode 12 shown in the figure and not-shown detection electrode 12 adjacent to detection electrode 12 shown in the figure.

Each of rhombic floating electrodes 131 shown in FIG. 9 is sized so as to have a length H in the vertical direction (hereinafter referred to as "height" as well) of approximately 815 μm, and a length W in the horizontal direction (hereinafter referred to as "width" as well) of approximately 400 μm. The vertical direction in this context corresponds to the extension direction of detection electrodes 12, while the horizontal direction corresponds to the direction crossing the extension direction of detection electrodes 12 at right angles. In addition, slits extending obliquely with respect to the vertical direction are formed between adjoining floating electrodes 131 as illustrated in FIG. 9. According to the example shown in FIG. 9, the respective slits are sized as follows. Slit D1 formed between adjoining floating electrodes 131 has a length of approximately 13.4 μm. Slit D2 between vertexes of adjoining floating electrodes 131 in the horizontal direction has a length of approximately 20 μm. Slit D3 between vertexes of adjoining floating electrodes 131 in the vertical direction has a length of approximately 20 μm. Slit D4 formed between floating electrode 131 and detection electrode 12 has a length of approximately 10 μm.

According to the example shown in FIG. 9, the length of R×T is set at approximately 4.2 mm as a length sufficient for arranging approximately ten floating electrodes 131. On the other hand, width R×W of detection electrode 12 in the horizontal direction is set at 820 μm as a length sufficient for arranging approximately two floating electrodes 131. According to the example shown in FIG. 9, therefore, floating electrodes 131 disposed at the foregoing intervals are spread all over the space between detection electrodes 12, with eight floating electrodes 131 provided between adjoining detection electrodes 12.

The slits formed between the floating electrodes are produced as a result of formation of the respective floating electrodes with clearances left between the adjoining floating electrodes. However, for simplifying the explanation, the present exemplary embodiment and the following exemplary embodiments use such expressions as "form slits" and "provide slits" in some cases.

The structure of the present exemplary embodiment includes a plurality of floating electrodes 131 between detection electrodes 12, and the slits extending between floating electrodes 131 obliquely with respect to the vertical direction as illustrated in FIG. 9 for the following reason.

According to liquid crystal panel 21 combined with the touch panel as one body, a difference in light transmittance is produced between an area including detection electrodes 12 and an area not including detection electrodes 12. In this case, wiring patterns of detection electrodes 12 may be visually recognized as fringe patterns. These fringe patterns may deteriorate display quality of images.

According to the present exemplary embodiment, therefore, floating electrodes 131 are provided between detection electrodes 12 so as to adjust the light transmittance of the area not including detection electrodes 12 (area between detection electrodes 12) and the light transmittance of the area including detection electrodes 12 to substantially equivalent values. In addition, floating electrodes 131 are made of substantially the same material as the material of detection electrodes 12. This structure equalizes the light transmittance of the touch panel, and reduces visibility of fringe patterns produced by the wiring patterns of detection electrodes 12. In addition, no electric connection is provided between floating electrodes 131 and other electrodes such as detection electrodes 12 so as to avoid electric influences imposed on various operations of liquid crystal panel 21. Accordingly, floating electrodes 131 are electrodes electrically left in a floating state.

However, depending on the shapes of the floating electrodes, there is a possibility that interference fringes called moire fringes are produced between the slits formed between the floating electrodes, and components such as electrodes, color filters, and a black matrix formed on liquid crystal panel 21. Accordingly, it is preferable that the shapes, sizes, and arrangement intervals of the floating electrodes are appropriately determined so as to avoid generation of interference fringes and reduce visibility of the slits while equalizing the light transmittance.

For the purpose of appropriate determination of these conditions, the inventors of the present application prepared a plurality of panels for evaluation to carry out subjective evaluations of these panels. The panels contain a plurality of floating electrodes different in shape and size for each panel, and disposed between detection electrodes.

FIG. 10 is a diagram showing summarized results of the subjective evaluations of the plurality of panels prepared for evaluation. In this experiment, three evaluators (evaluators A, B, and C) carried out the subjective evaluations concerning the following two points.

Evaluation Test A: Grade the degree of visibility of fringe patterns produced by the wiring patterns of the detection electrodes Evaluation Test B: Grade the degree of visibility of interference fringes Grades were given on the basis of scores ranging from 1 to 5. The score decreases as the visibilities of the wiring patterns of the detection electrodes and the interference fringes lower. A score of 2 was given to the borderline between visibility and non-visibility. A score of 1 was given to substantially non-visible ones. The interference fringes in Evaluation Test B are produced by interference between the floating electrodes (slits) and one or plural components of electrodes, color filters, and a black matrix formed on the liquid crystal panel. In the subjective evaluations carried out herein, the factor causing interference fringes was not questioned.

In this experiment, 14 panels (panel Nos. 1 through 14) were prepared, which contained floating electrodes different in shape and size for each panel. Five types of shapes including rectangular, wavy, cross-shaped, hexagonal, and rhombic shapes were determined as the shapes of the floating electrodes as illustrated in FIG. 10. The sizes of the floating electrodes were determined based on the size of pixels formed on the panels. The size of the pixel as a reference is 117.75 µm, and the sizes of the respective floating electrodes in FIG. 10 are expressed as multiples of the size of the pixel as the reference. FIG. 10 shows the shapes of the floating electrodes, and the sizes of the floating electrodes expressed as lengths in the vertical direction (extension direction of the detection electrodes)×lengths in the horizontal direction (direction perpendicular to the extension direction of the detection electrodes). For example, the panel No. 1 expressed as "rectangular 1×2" indicates a panel including rectangular floating electrodes each having a height of 117.75 µm in the vertical direction, and a width of 235.5 µm in the horizontal direction. Each of the panels contained a plurality of floating electrodes having the corresponding shape and size shown in FIG. 10 and disposed between the detection electrodes, with a slit of approximately 15 µm formed between one and the adjoining one of the floating electrodes.

According to the results of these subject evaluations, a preferable score of lower than 2 was given to the panel Nos. 13 and 14 including rhombic floating electrodes, as an average score of the three evaluators for both Evaluation Tests A and B as shown in FIG. 10.

For the panel Nos. 13 and 14, similar results were obtained regardless of the different size of the rhombus. After repeating further experiments, it was found that the advantage of reducing the visibility of the foregoing wiring patterns of the detection electrodes and interference fringes was offered when slits were formed obliquely with respect to the vertical direction. According to these experiments, it was confirmed that this advantage was provided when slits were formed at angle ranging from approximately 13.6 degrees to approximately 64.1 degrees (inclusive) with respect to the vertical direction.

The vertical direction in this context corresponds to the extension direction of detection electrodes 12, the direction perpendicular to the longitudinal direction of liquid crystal panel 21, or the arrangement direction of the sub pixels in the same colors.

Moreover, it was confirmed that the preferable arrangement is that the slits extend not substantially in one direction, but substantially in two directions substantially line-symmetric with respect to the vertical direction.

In consideration of these results, a plurality of floating electrodes 131 in rhombic shapes are formed, and arranged between detection electrodes 12 in the manner illustrated in FIG. 9 according to the present exemplary embodiment.

In the example illustrated in FIG. 9, each of floating electrodes 131 has a rhombic shape of 815 µm in height×400 µm in width. The angle θ of the slits with respect to the vertical direction in this example is approximately 26.1 degrees.

According to the experiment, it was confirmed that the preferable size (height) of each of the floating electrodes in the vertical direction is 1,650 µm or shorter. In the case of the structure including rhombic floating electrodes each having a height of 1,650 µm, an angle θ of the slits with respect to the vertical direction becomes approximately 13.6 degrees as the foregoing minimum angle when the width is set at 400 µm.

Moreover, according to the experiment, it was confirmed that the preferable size (width) of each of the floating electrodes in the horizontal direction is 820 nm or shorter. In the case of the structure including rhombic floating electrodes each having a width of 820 μm, the angle θ of the slits with respect to the vertical direction becomes approximately 64.1 degrees as the foregoing maximum angle when the height is set at 397.5 μm.

While eight floating electrodes 131 are provided between detection electrodes 12 in the structure example shown in FIG. 9, the number of floating electrodes 131 in the present exemplary embodiment is not limited to this number. It is preferable that the number of the floating electrodes provided between detection electrodes 12 is set to an optimum number in accordance with the electrode width of detection electrodes 12, the width between detection electrodes 12, the size of floating electrodes 131, the width of the slits, and other conditions.

The size of floating electrodes 131, and the size of the slits formed between floating electrodes 131 are not limited to the foregoing values. It is preferable that the floating electrodes and the slits are formed within such a range as to provide the advantage of reducing the visibility the foregoing wiring patterns of the detection electrodes and interference fringes, to reduce the visibility of the slits, and to avoid electric contacts between floating electrodes 131. According to the present exemplary embodiment, each width of the slits is set to a width of 25 μm or less so as to reduce the visibility of the slits. Moreover, electric contacts between floating electrodes 131 are avoided so as to reduce capacitance, as small as possible, that has influence on the electric operation of liquid crystal panel 21 and a touch input device.

Figure 11:
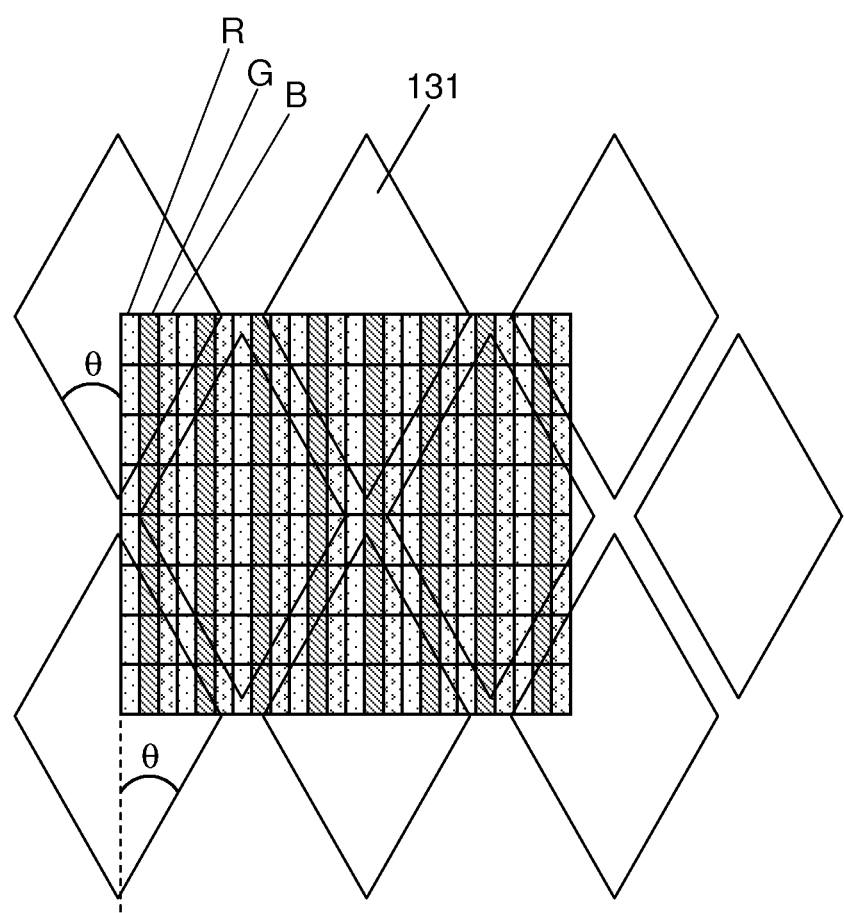
FIG. 11 is a plan view schematically illustrating a positional relationship between pixel electrodes and floating electrodes of the display device according to the first exemplary embodiment.

FIG. 11 is a plan view schematically illustrating a positional relationship between the pixel electrodes and floating electrodes 131 on display device 100 according to the first exemplary embodiment.

As illustrated in FIG. 11, a plurality of sub pixels R, sub pixels G, and sub pixels B are arranged in matrix in the horizontal direction and the vertical direction on liquid crystal panel 21 of display device 100. According to liquid crystal panel 21, the sub pixels in the same colors are arranged in the vertical direction. In addition, the three sub pixels in different three colors are arranged in the horizontal direction to form one pixel.

As described above, each of the slits formed between adjoining floating electrodes 131 has a width of 25 μm or less, and is obliquely disposed at the angle θ with respect to the vertical direction (arrangement direction of sub pixels in the same colors) as illustrated in FIG. 11. In other words, the slits are disposed not in parallel with both the arrangement directions of the pixels (horizontal direction and vertical direction), and do not cross these directions at right angles.

As illustrated in FIG. 11, the arrangement cycle of floating electrodes 131 is not required to be a natural number multiple of the cycle of the pixel. Similarly, the arrangement cycle of detection electrodes 12 is not required to be a natural number multiple of the cycle of the pixel. This is because the advantage of reducing the visibility of the foregoing wiring patterns of the detection electrodes and interference fringes can be offered by the arrangement of slits obliquely formed between floating electrodes 131 according to the present exemplary embodiment.

Figure 12:
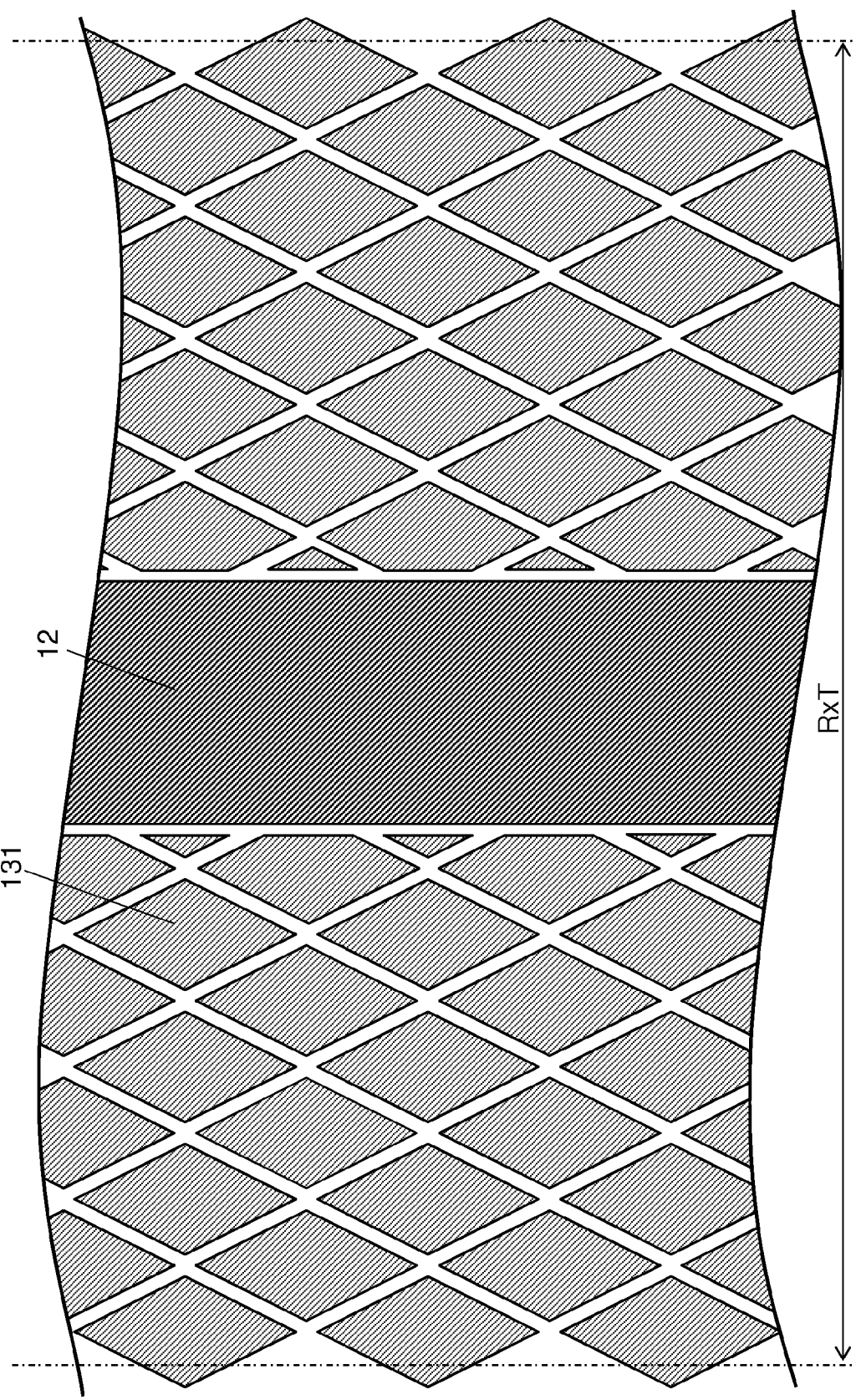
FIG. 12 is a plan view schematically illustrating another example of the constituent patterns of the detection electrodes and the floating electrodes of the display device according to the first exemplary embodiment.

FIG. 12 is a plan view schematically illustrating another example of the constituent patterns of detection electrodes 12 and floating electrodes 131 of the display device according to the first exemplary embodiment.

While the relative positional relationship between floating electrodes 131 and detection electrodes 12 is determined such that the slits between floating electrodes 131 and detection electrodes 12 are formed on diagonals connecting vertical angles of the rhombuses of floating electrodes 131 in the example of FIG. 9, the present exemplary embodiment is not limited at all to the structure shown herein.

For example, as illustrated in FIG. 12, the slits between floating electrodes 131 and detection electrodes 12 may be formed at positions deviated from the diagonals connecting the vertical angles the rhombuses of floating electrodes 131. As illustrated in FIG. 12, for example, the relative positional relationship between floating electrodes 131 and detection electrodes 12 may be arbitrarily determined. Even in these structures, the slits between floating electrodes 131 are formed substantially in the same manner as in the structure example shown in FIG. 9, and thus advantages similar to those explained in conjunction with FIG. 9 are offered.

Figure 13:
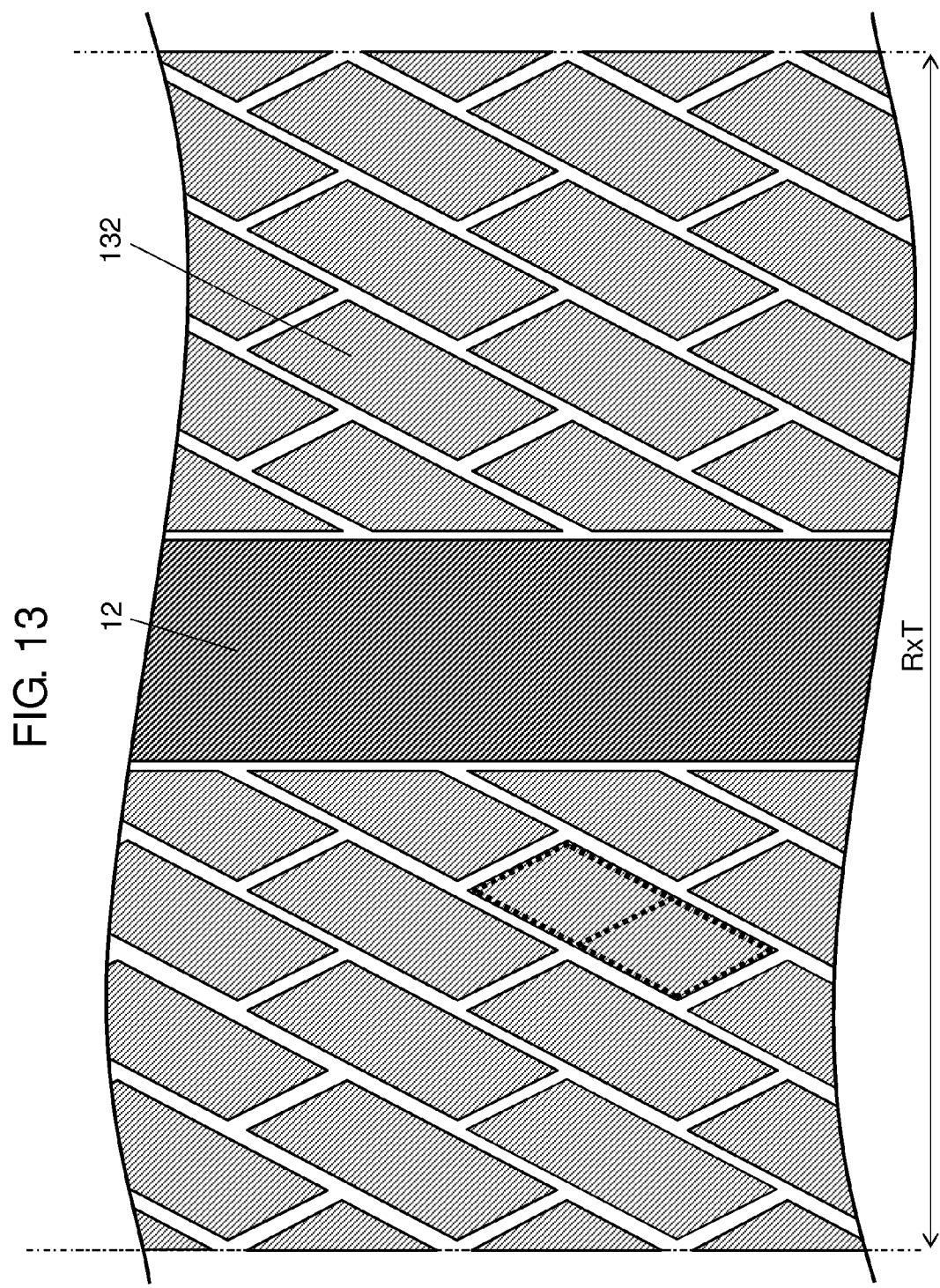
FIG. 13 is a plan view schematically illustrating still another example of the constituent patterns of the detection electrodes and the floating electrodes of the display device according to the first exemplary embodiment.

FIG. 13 is a plan view schematically illustrating still another example of the constituent patterns of the detection electrodes and the floating electrodes of the display device according to the first exemplary embodiment.

While each of floating electrodes 131 in the examples shown in FIGS. 9 and 12 has a rhombic shape, each shape of the floating electrodes in the present exemplary embodiment is not limited at all to a rhombic shape. According to the present exemplary embodiment, each of floating electrodes 132 may have a parallelogrammatic shape as illustrated in FIG. 13, for example.

Each shape of floating electrodes 132 shown in FIG. 13 is substantially equivalent to a shape formed by connecting two rhombic floating electrodes 131 shown in FIGS. 9 and 12. The rhombic shapes shown in FIGS. 9 and 12 are indicated by broken lines in FIG. 13.

According to the structure examples shown in FIGS. 9 and 12, the slits between floating electrodes 131 extend successively both in the oblique direction toward the right and in the oblique direction toward the left. On the other hand, according to the structure example shown in FIG. 13, the slits extending in the oblique direction toward the right (direction along the longer sides of floating electrodes 132) are successively formed, but the slits extending in the oblique direction toward the left (direction along the short sides of floating electrodes 132) are blocked by floating electrodes 132 and not successively formed.

The slits having these shapes offer advantages similar to the advantages described in conjunction with FIG. 9 when the conditions specified in conjunction with FIG. 9 are met, i.e., when floating electrodes 132 are formed such that each of the slits is disposed at an angle ranging approximately from 13.6 degrees to approximately 64.1 degrees (inclusive) with respect to the vertical direction, and has a width of 25 μm or less.

Figure 14:
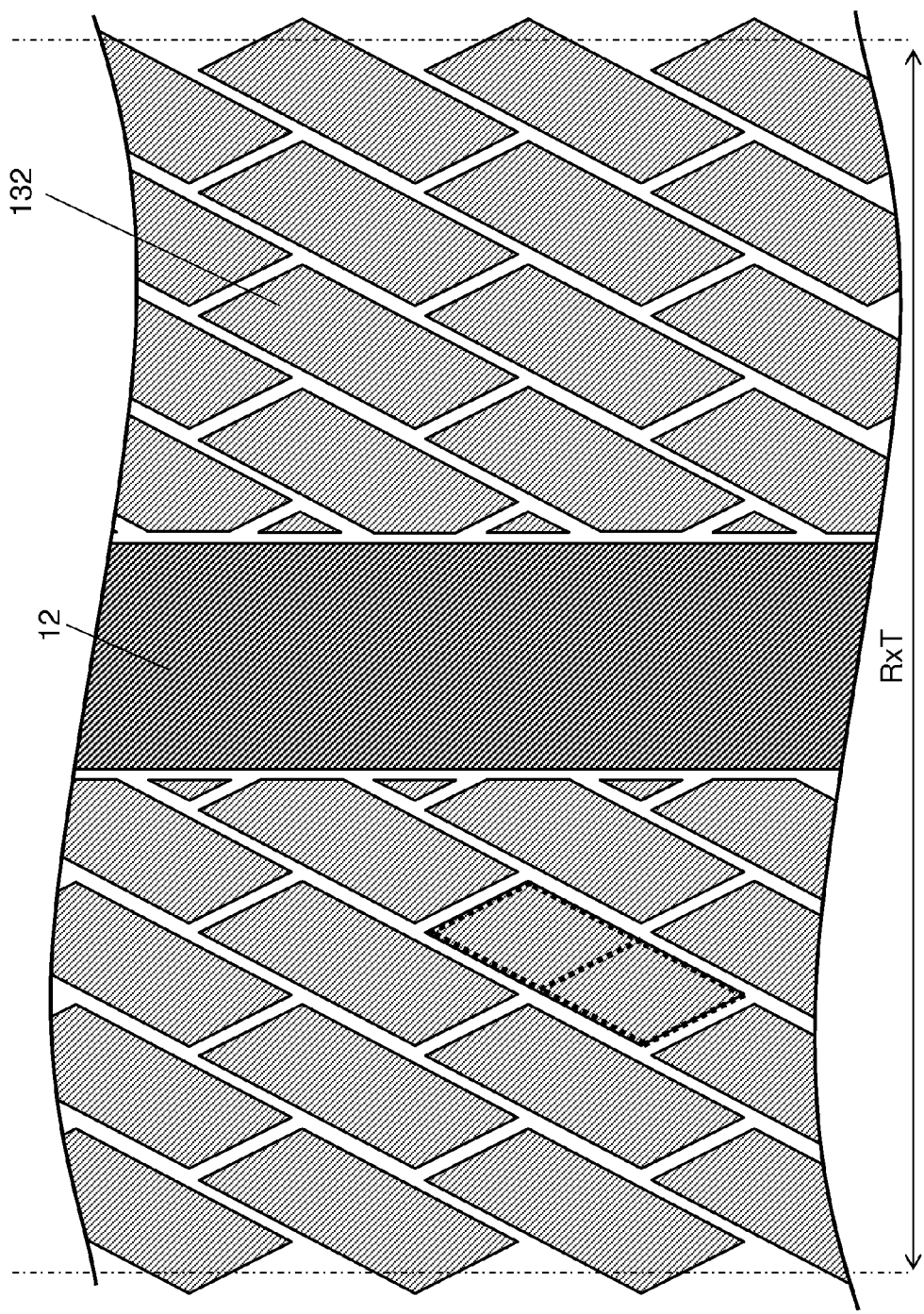
FIG. 14 is a plan view schematically illustrating yet another example of the constituent patterns of the detection electrodes and the floating electrodes of the display device according to the first exemplary embodiment.

In addition, as described in conjunction with FIG. 12, the relative positional relationship between floating electrodes 132 and detection electrodes 12 is not limited at all to the structure shown in FIG. 13. FIG. 14 is a plan view schematically illustrating yet another example of the constituent patterns of the detection electrodes and the floating electrodes of the display device according to the first exemplary embodiment. The relative positional relationship between floating electrodes 132 and detection electrodes 12 may be arbitrarily determined as illustrated in FIG. 14, for example. This structure offers advantages similar to the advantages described in conjunction with FIG. 9.

[1-4. Effect]

As described above, the input device according to the present exemplary embodiment is included in display device 100 including a plurality of pixels, and configured to detect the contact position of the user. The input device includes the plurality of first electrodes (driving electrodes 11), the plurality of second electrodes (detection electrodes 12) disposed so as to cross the first electrodes, and the plurality of third electrodes (floating electrodes) disposed between the second electrodes. The slits extending obliquely with respect to the extension direction of the second electrodes (detection electrodes 12) are formed between the third electrodes.

The slits formed between the third electrodes (floating electrodes) may be formed so as to extend in two directions substantially line-symmetric with respect to the extension direction of the second electrodes (detection electrodes 12).

The slits formed between the third electrodes (floating electrodes) may be formed at an angle ranging from 13.6 degrees to 64.1 degrees (inclusive) with respect to the extension direction of the second electrodes (detection electrodes 12).

Each shape of the third electrodes (floating electrodes) may be a rhombic shape or a parallelogrammatic shape.

According to the present exemplary embodiment, the structure provided with the plurality of third electrodes (floating electrodes) between the second electrodes (detection electrodes 12) equalizes the light transmittance of the area including the second electrodes (detection electrodes 12) of the input device with the light transmittance of the area not including the second electrodes of the input device, and reduces visibility of the wiring patterns of detection electrodes 12 as fringe patterns.

In this case, the slits formed between the third electrodes (floating electrodes) may generate interference fringes between the slits and electrodes, color filters, or a black matrix provided on liquid crystal panel 21.

For example, when the slits between the third electrodes (floating electrodes) are formed in a direction in parallel with the arrangement direction of pixels, these interference fringes easily appear. This is because only slight deviation between the arrangement cycle of pixels and the arrangement cycle of slits may generate interference fringes when the arrangement direction of the pixels is in parallel with the extension direction of the slits. The interference fringes thus generated are likely to be visually recognized as noise.

According to the present exemplary embodiment, however, the slits between the third electrodes (floating electrodes) are formed so as to extend obliquely with respect to the extension direction of the second electrodes (detection electrodes 12). In this case, generation of such interference fringes decreases.

More specifically, the structure according to the present exemplary embodiment decreases interference fringes generated by interference between the slits and electrodes, color filters, or a black matrix, while reducing the visibility of the wiring patterns of the electrodes by equalizing the light transmittance of the touch panel.

The extension direction of the second electrodes (detection electrodes 12) may be expressed as the direction perpendicular to the longitudinal direction of liquid crystal panel 21, or the arrangement direction of the sub pixels in the same colors.

With increase in the size and definition of a liquid crystal panel, weight reduction of the liquid crystal panel and resistance reduction of transparent electrode become crucial issues. For reducing the weight, such a method may be used which polishes a substrate on which liquid cells are formed. However, when the substrate is made lightweight by polishing, the transparent electrode needs to be formed after polishing, and thus the heat resistant temperature of the liquid cells is generally limited to a low temperature of 100° C. or less. Accordingly, in the case of the lightweight liquid crystal panel produced by this method, ITO (tin-doped indium oxide) is difficult to be formed at a high temperature at the time of production of transparent electrode (ITO electrode) from ITO, and thus the transparent electrode is often produced from amorphous ITO formed at a low temperature. However, amorphous ITO has a higher sheet resistance than the sheet resistance of crystalline ITO electrode produced at a high temperature. In this case, the film thickness of ITO electrode needs to be raised so as to reduce the resistance of transparent electrode produced from amorphous ITO. However, amorphous ITO has a lower light transmittance than the light transmittance of crystalline ITO electrode, in which condition the light transmittance further decreases with increase in the film thickness of ITO electrode. Accordingly, the visibility of the foregoing wiring patterns of the detection electrodes and interference fringes further increases.

According to the input device in the present exemplary embodiment, however, the visibility of the foregoing wiring patterns of the detection electrodes and interference fringes decreases even in the case of the lightweight liquid crystal panel produced by polishing as described herein.

Second Exemplary Embodiment

While sides of detection electrodes 12 linearly extend in the extension direction of detection electrodes 12 in the first exemplary embodiment, each shape of the detection electrodes is not limited at all to this shape. The detection electrodes may be formed to have sides other than linear sides. Described with reference to FIGS. 15 and 16 in the present exemplary embodiment are detection electrodes having shapes other than the shapes of detection electrodes 12 shown in the first exemplary embodiment.

[2-1. Configuration]

A display device according to a second exemplary embodiment has a constitution substantially similar to the constitution of display device 100 shown in the first exemplary embodiment, and thus the details of the constitution of the display device are not repeatedly described. In addition, the definitions of the vertical direction and the horizontal direction in the present exemplary embodiment are substantially the same as the definitions of the vertical direction and the horizontal direction shown in the first exemplary embodiment.

[2-2. Operation]

The display device according to the second exemplary embodiment performs operation substantially similar to the operation of display device 100 shown in the first exemplary embodiment, and thus the details of the operation of the display device are not repeatedly described herein.

[2-3. Structure]

An electrode structure of a touch sensor according to the present exemplary embodiment is hereinafter described with reference to FIGS. 15 and 16.

Figure 15:
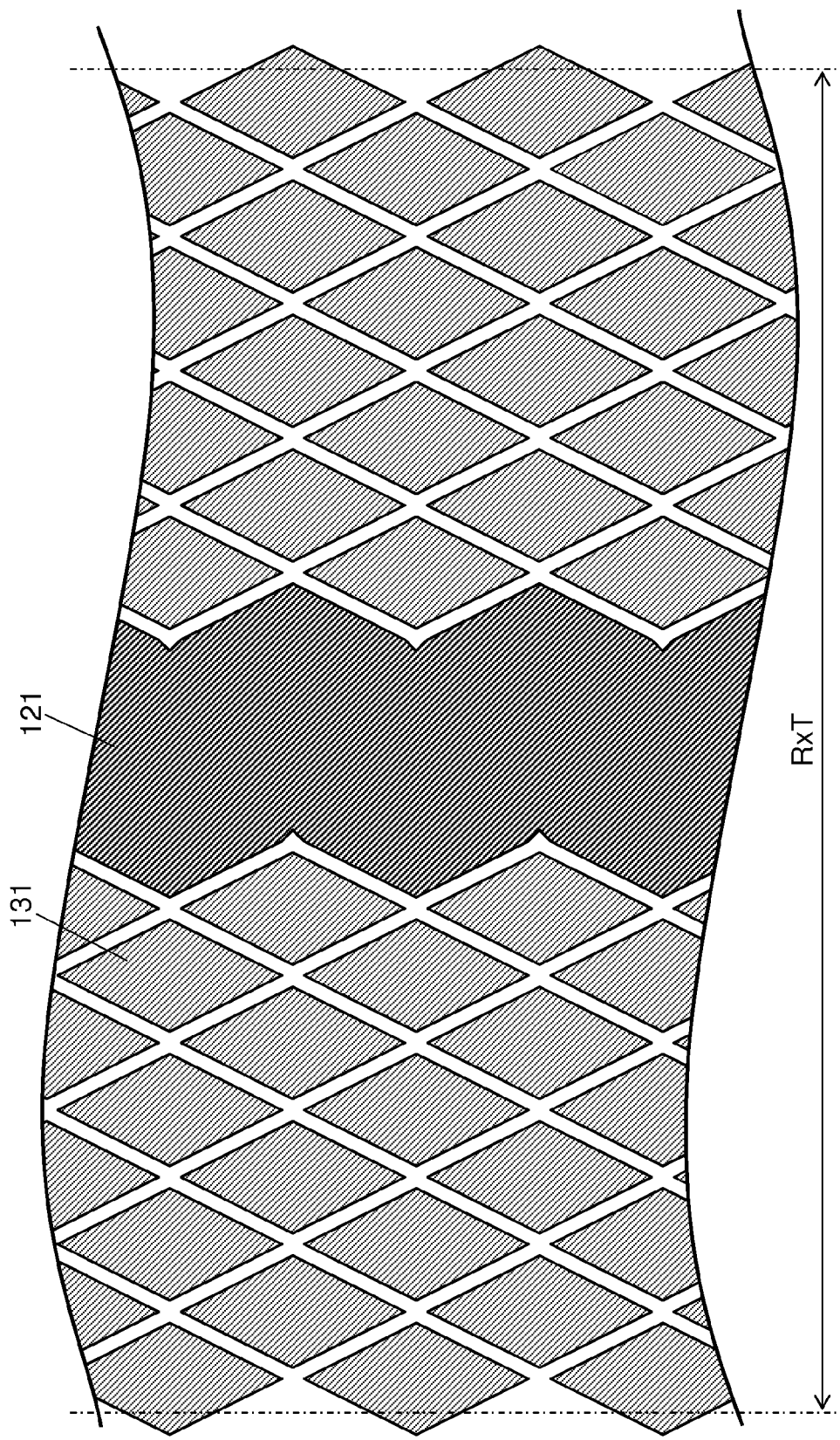
FIG. 15 is a plan view schematically illustrating an example of constituent patterns of detection electrodes and floating electrodes of a display device according to a second exemplary embodiment.

FIG. 15 is a plan view schematically illustrating an example of constituent patterns of detection electrodes 121 and floating electrodes 131 of the display device according to the second exemplary embodiment.

Floating electrodes 131 shown in FIG. 15 are substantially similar to floating electrodes 131 shown in the first exemplary embodiment in conjunction with FIG. 9. In addition, conditions required for forming the floating electrodes in the present exemplary embodiment are substantially similar to the corresponding conditions shown in the first exemplary embodiment. The details of floating electrodes 131 and the forming conditions thereof are therefore not repeatedly described herein. Slits formed between floating electrodes 131 in FIG. 15 are substantially similar to the slits formed between floating electrodes 131 shown in the first exemplary embodiment in conjunction with FIG. 9. In addition, conditions required for forming the slits in the present exemplary embodiment are substantially similar to the corresponding conditions shown in the first exemplary embodiment. The details of the slits and the forming condition thereof are therefore not repeatedly described herein.

According to the present exemplary embodiment, detection electrodes 121 shown in FIG. 15 are different from detection electrodes 12 shown in FIG. 9 in that each side portion of detection electrodes 121 adjacent to floating electrodes 131 has a zigzag shape in accordance with the shapes and arrangement positions of floating electrodes 131.

According to the present exemplary embodiment, detection electrodes 121 have sides in zigzag shapes in accordance with the shapes and arrangement positions of floating electrodes 131. In this case, the slits formed between detection electrodes 121 and floating electrodes 131 have shapes substantially similar to the shapes of the slits formed between floating electrodes 131.

Figure 16:
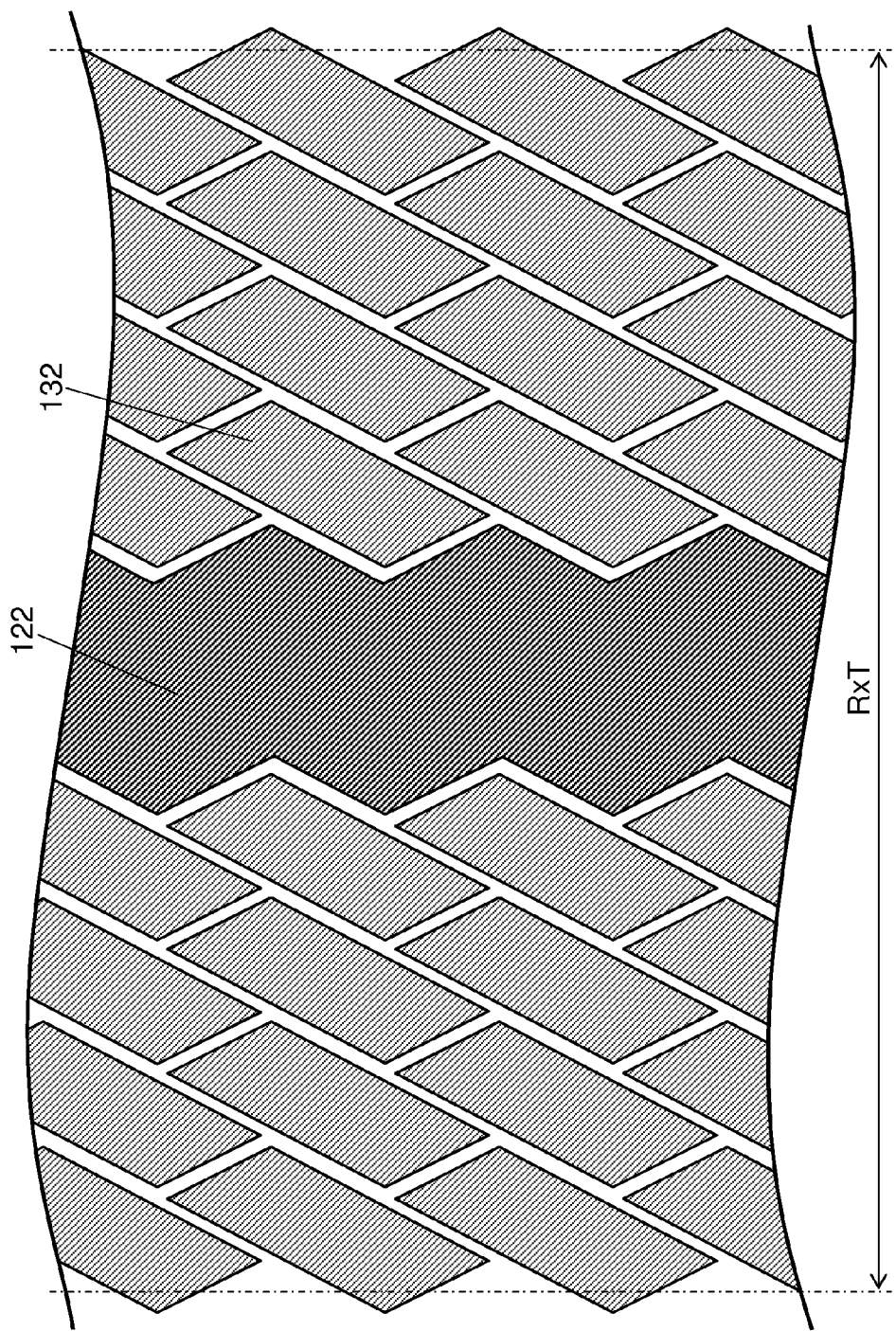
FIG. 16 is a plan view schematically illustrating another example of the constituent patterns of the detection electrodes and the floating electrodes of the display device according to the second exemplary embodiment.

FIG. 16 is a plan view schematically illustrating another example of the constituent patterns of detection electrodes 122 and floating electrodes 132 of the display device according to the second exemplary embodiment.

Floating electrodes 132 shown in FIG. 16 are substantially similar to floating electrodes 132 shown in the first exemplary embodiment in conjunction with FIG. 13. In addition, slits formed between floating electrodes 132 shown in FIG. 16 are substantially the same as the slits formed between floating electrodes 132 shown in the first exemplary embodiment in conjunction with FIG. 13.

Similarly to the structure shown in FIG. 15, each side portion of detection electrodes 122 adjacent to floating electrodes 132 shown in FIG. 16 has a zigzag shape in accordance with the shapes and arrangement positions of floating electrodes 132. Moreover, the slits formed between detection electrodes 122 and floating electrodes 132 have shapes substantially similar to the shapes of the slits formed between floating electrodes 132.

[2-4. Effect]

As described above, the sides of the second electrodes (detection electrodes) included in the input device according to the present exemplary embodiment have zigzag shapes in accordance with the shapes and arrangement positions of the third electrodes (floating electrodes).

Accordingly, the slits formed between the second electrodes (detection electrodes) and the third electrodes (floating electrodes) have shapes substantially similar to the shapes of the slits formed between the third electrodes (floating electrodes).

According to the structure example shown in the first exemplary embodiment, the sides of detection electrodes 12 are linear, and thus the slits formed between detection electrodes 12 and the floating electrodes are substantially linear as illustrated in FIGS. 9 and 13.

According to the input device of the present exemplary embodiment, however, the slits formed between the detection electrodes (detection electrodes 121 or detection electrodes 122, for example) and the floating electrodes extend obliquely with respect to the extension direction of the detection electrodes. In this case, the number of the linear slits decreases in comparison with the corresponding number according to the first exemplary embodiment. Accordingly, the advantage of reducing the visibility of the wiring patterns of the detection electrodes and the interference fringes described in the first exemplary embodiment further improves.

Third Exemplary Embodiment

According to the second exemplary embodiment, the detection electrode having zigzag-shaped sides in accordance with the shapes and the arrangement positions of the floating electrodes is shown in FIGS. 15 and 16. Each of these detection electrodes is formed to electrically work as one electrode. Alternatively, a detection electrode electrically working as one electrode may be formed of two pieces of detection electrodes, for example. Described with reference to FIGS. 17 and 18 in the present exemplary embodiment is a structure example which includes detection electrodes each electrically working as one electrode but formed of two pieces of detection electrodes.

[3-1. Configuration]

A display device according to a third exemplary embodiment has substantially the same constitution as the constitution of display device 100 shown in the first exemplary embodiment, and thus the details of the constitution of the display device are not repeatedly described herein. In addition, the definitions of the vertical direction and the horizontal direction in the present exemplary embodiment are substantially the same as the definitions of the vertical direction and the horizontal direction shown in the first exemplary embodiment.

[3-2. Operation]

The display device according to the third exemplary embodiment performs substantially the same operation as the operation of display device 100 shown in the first exemplary embodiment. The details of the operation of the display device are therefore not repeatedly described herein.

[3-3. Structure]

An electrode structure of a touch sensor according to the present exemplary embodiment is hereinafter described with reference to FIGS. 17 and 18.

Figure 17:
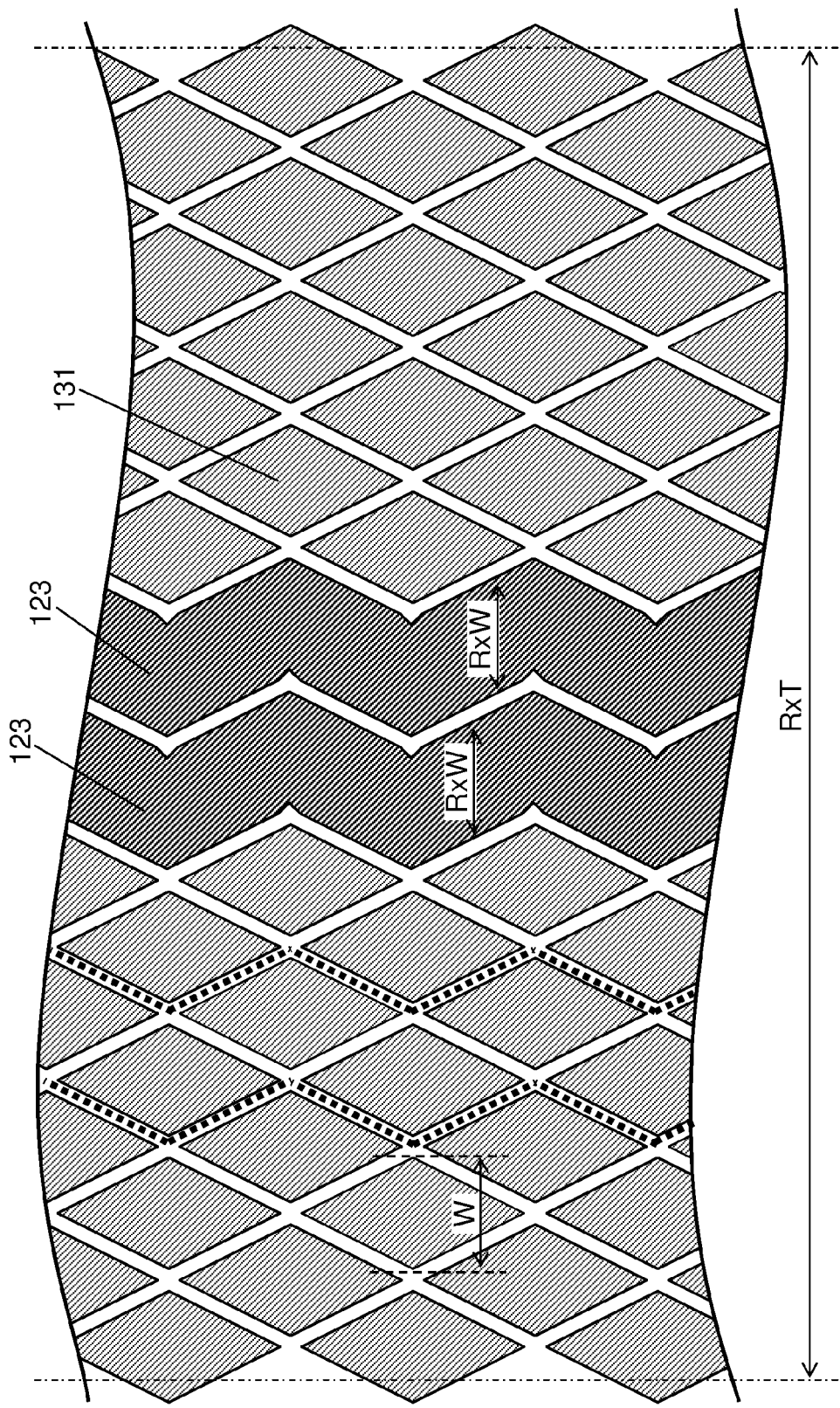
FIG. 17 is a plan view schematically illustrating an example of constituent patterns of detection electrodes and floating electrodes of a display device according to a third exemplary embodiment.

FIG. 17 is a plan view schematically illustrating an example of constituent patterns of detection electrodes 123 and floating electrodes 131 of the display device according to the third exemplary embodiment.

Floating electrodes 131 shown in FIG. 17 are substantially the same as floating electrodes 131 shown in the first exemplary embodiment in FIG. 9. In addition, conditions required for forming the floating electrodes in the present exemplary embodiment are substantially similar to the corresponding conditions shown in the first exemplary embodiment. The details of floating electrodes 131 and the forming conditions thereof are therefore not repeatedly described herein. Slits formed between floating electrodes 131 in FIG. 17 are substantially similar to the slits formed between floating electrodes 131 shown in the first exemplary embodiment in FIG. 9. In addition, conditions required for forming the slits in the present exemplary embodiment are substantially similar to the corresponding conditions shown in the first exemplary embodiment. The details of the slits and the forming conditions thereof are not repeatedly described herein.

According to the present exemplary embodiment, detection electrodes 123 shown in FIG. 17 have side portions located adjacent to floating electrodes 131 and formed in zigzag shapes in accordance with the shapes and arrangement positions of floating electrodes 131, similarly to the side portions of detection electrode 121 shown in FIG. 15.

However, detection electrodes 123 shown in FIG. 17 are different from detection electrodes 121 shown in FIG. 15 in that the detection electrode electrically working as one detection electrode is formed of two pieces of detection electrodes 123 extending in the vertical direction. More specifically, two detection electrodes 123 shown in FIG. 17 are electrically connected to each other to electrically work as one detection electrode, but are separated from each other as discrete two pieces in appearance by a slit formed between detection electrodes 123.

Adjoining side portions of respective detection electrodes 123 have zigzag shapes such that the slit formed between detection electrodes 123 becomes substantially similar to the zigzag-shaped slits formed between detection electrodes 123 and floating electrodes 131. In other words, the slit formed between detection electrodes 123 has a zigzag shape in correspondence with the zigzag-shaped slits formed between detection electrodes 123 and floating electrodes 131. Moreover, each of detection electrodes 123 is sized to have width R×W of substantially the same size as width W of each of floating electrodes 131.

According to this structure, the intervals of the slits formed between floating electrodes 131 become substantially equivalent to the intervals of the slits formed between detection electrodes 123 and floating electrodes 131 and the slits formed between detection electrodes 123. This structure produces substantially uniform intervals of the slits. Moreover, this structure assimilates each shape of detection electrodes 123 to a shape (indicated by broken lines in FIG. 17) formed by envelopes of a plurality of floating electrodes 131 arranged in the vertical direction.

Figure 18:
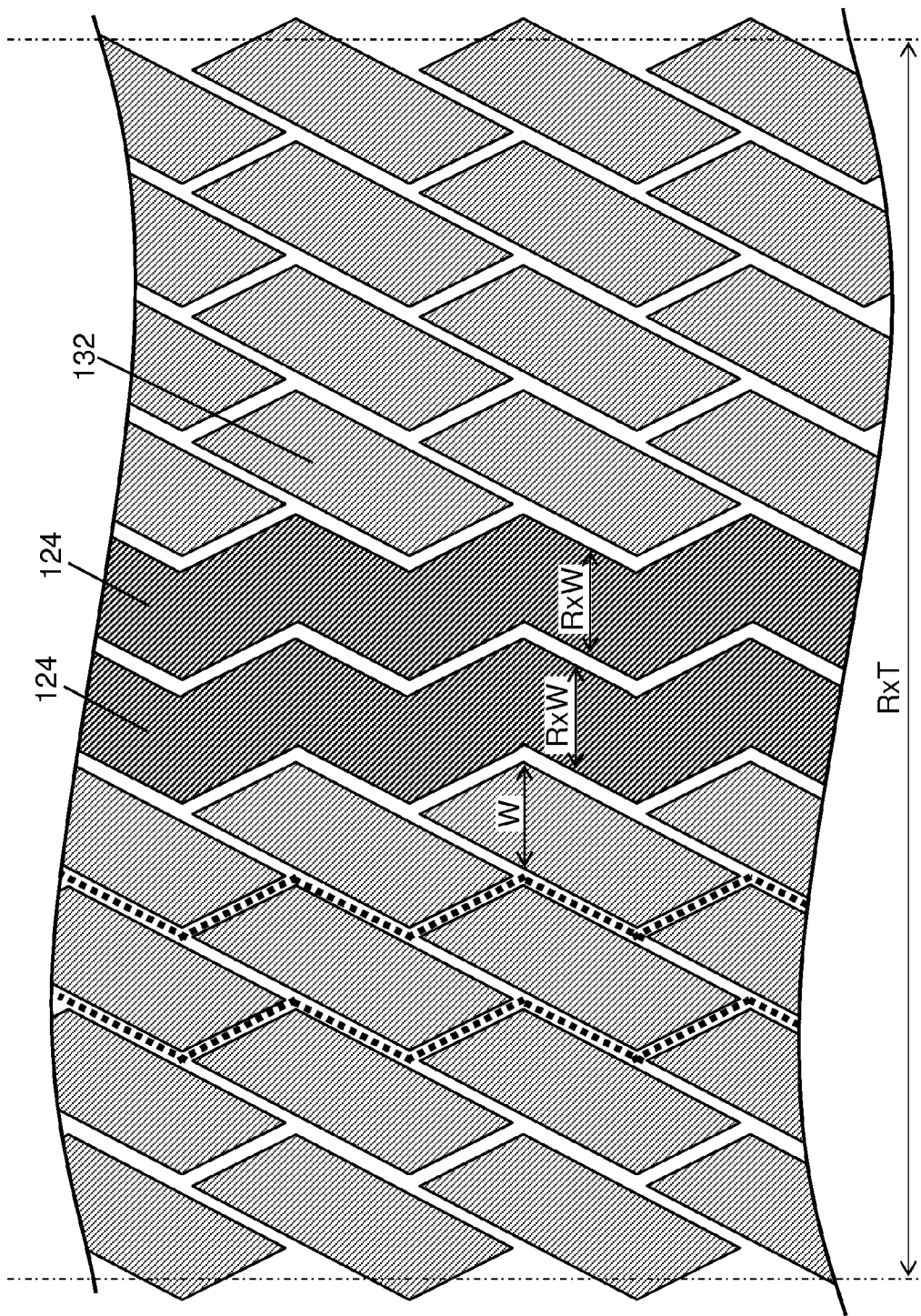
FIG. 18 is a plan view schematically illustrating another example of the constituent patterns of the detection electrodes and the floating electrodes of the display device according to the third exemplary embodiment.

FIG. 18 is a plan view schematically illustrating another example of the constituent patterns of detection electrodes 124 and floating electrodes 132 of the display device according to the third exemplary embodiment.

Floating electrodes 132 shown in FIG. 18 are substantially similar to floating electrodes 132 shown in the first exemplary embodiment in conjunction with FIG. 13. Similarly, slits formed between floating electrodes 132 shown in FIG. 18 are substantially similar to the slits formed between floating electrodes 132 shown in the first exemplary embodiment in conjunction with FIG. 13.

Detection electrode 124 shown in FIG. 18 has side portions located adjacent to floating electrodes 132 and formed in zigzag shapes in accordance with the shapes and arrangement positions of floating electrodes 132, similarly to the side portions of detection electrodes 122 shown in FIG. 16.

Similarly to the structure shown in FIG. 17, the detection electrode electrically working as one detection electrode shown in FIG. 18 is formed of two pieces of detection electrodes 124 extending in the vertical direction. More specifically, two detection electrodes 124 shown in FIG. 18 are electrically connected to each other to electrically work as one detection electrode, but are separated from each other as discrete two pieces in appearance by a slit formed between detection electrodes 124.

Adjoining side portions of respective detection electrodes 124 have zigzag shapes such that the slit formed between detection electrodes 124 becomes substantially similar to the zigzag-shaped slits formed between detection electrodes 124 and floating electrodes 132. Moreover, each of detection electrodes 124 is sized to have width R×W of substantially the same size as width W of each of floating electrodes 132.

According to this structure, the intervals of the slits formed between floating electrodes 132 become substantially equivalent to the intervals of the slits formed between detection electrodes 124 and floating electrodes 132 and the slits formed between detection electrodes 124. This structure produces substantially uniform intervals of the slits. Moreover, this structure assimilates each shape of detection electrodes 124 to a shape (indicated by broken lines in FIG. 18) formed by envelopes of a plurality of floating electrodes 132 arranged in the vertical direction.

[3-4. Effect]

According to the input device of the present exemplary embodiment described herein, each of the second electrodes (detection electrodes) electrically working as one electrode is formed of a plurality of electrodes (detection electrodes 123 or detection electrodes 124, for example).

Moreover, the slits formed between the plurality of electrodes (detection electrodes 123 or detection electrodes 124, for example) have zigzag shapes in correspondence with the slits formed between the second electrodes (detection electrodes) and the third electrodes (floating electrodes).

This structure forms slits between the detection electrodes and the floating electrodes in such shapes similar to the shapes of the slits formed between the floating electrodes, and further forms zigzag-shaped slits between the detection electrodes.

Accordingly, the advantage of reducing the visibility of the wiring patterns of the detection electrodes and the interference fringes described in the first exemplary embodiment further improves.

The plurality of electrodes (detection electrodes 123 or detection electrodes 124, for example) may be formed such that each width R×W of the plurality of electrodes (detection electrodes 123 or detection electrodes 124, for example) becomes substantially equivalent to each width W of the third electrodes (floating electrodes).

According to this structure, the intervals of the slits formed between the floating electrodes become substantially equivalent to the intervals of the slits formed between the detection electrodes and the floating electrodes and the slits formed between the detection electrodes. This structure produces substantially uniform intervals of the slits.

In other words, slits having substantially the same shape are formed substantially at the same intervals on the touch panel.

Accordingly, the structure in the present exemplary embodiment further improves the advantage of reducing the visibility of the wiring patterns of the detection electrodes and the interference fringes described in the first exemplary embodiment.

In the examples shown in FIGS. 17 and 18, the detection electrode electrically working as one electrode is formed of two pieces of detection electrodes. According to the present exemplary embodiment, connection parts for electrically connecting respective detection electrodes may be further provided as illustrated in FIGS. 19 and 20.

Figure 19:
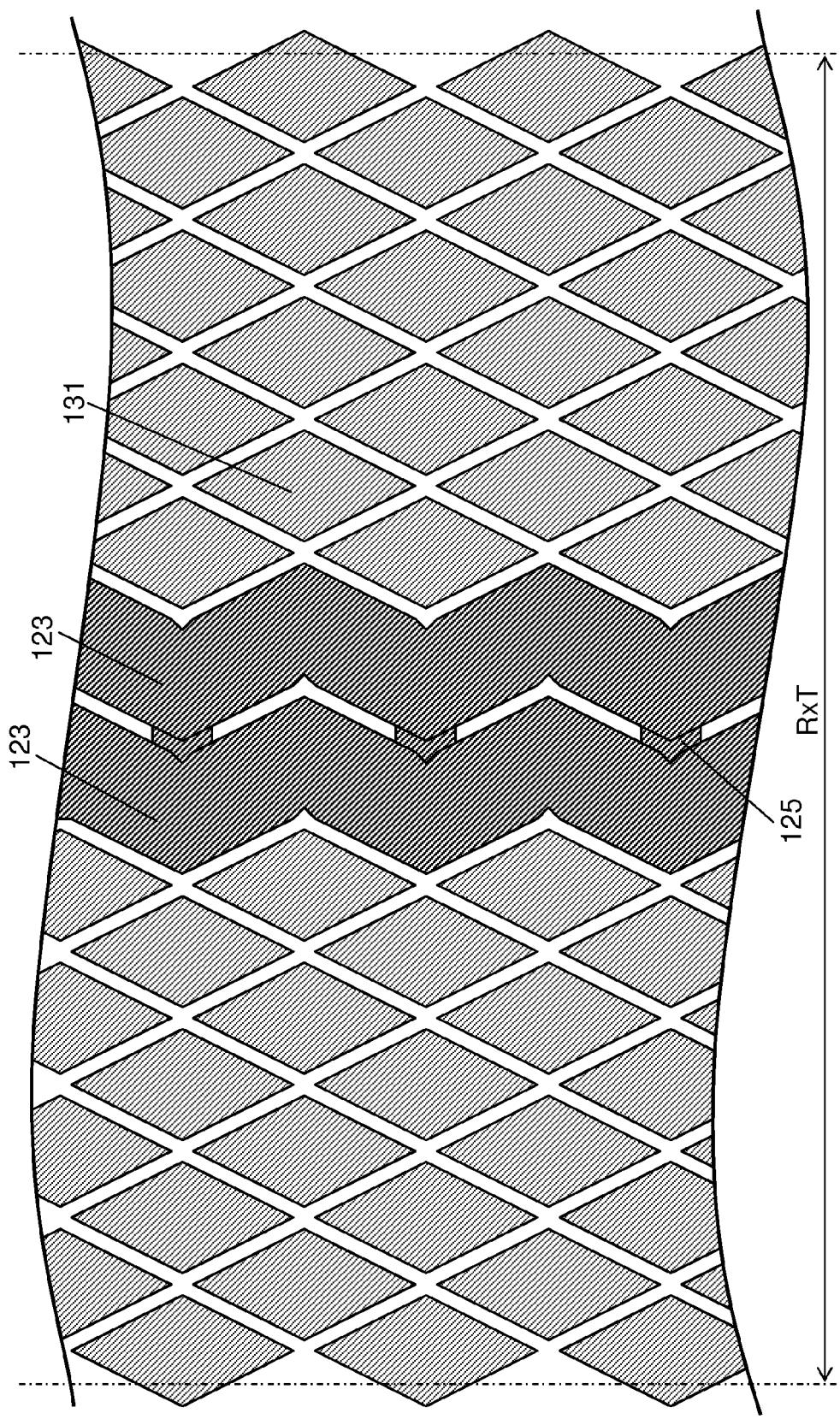
FIG. 19 is a plan view schematically illustrating still another example of the constituent patterns of the detection electrodes and the floating electrodes of the display device according to the third exemplary embodiment.

FIG. 19 is a plan view schematically illustrating still another example of the constituent patterns of detection electrodes 123 and floating electrodes 131 of the display device according to the third exemplary embodiment.

FIG. 20 is a plan view schematically illustrating yet another example of the constituent patterns of detection electrodes 124 and floating electrodes 132 of the display device according to the third exemplary embodiment.

Detection electrodes 123 and floating electrodes 131 shown in FIG. 19 are substantially similar to detection electrodes 123 and floating electrodes 131 shown in FIG. 17. However, detection electrodes 123 shown in FIG. 19 are provided with connection parts 125 for electrically connecting detection electrodes 123. Connection parts 125 may be provided at regular intervals as illustrated in FIG. 19.

Detection electrodes 124 and floating electrodes 132 shown in FIG. 20 are substantially similar to detection electrodes 124 and floating electrodes 132 shown in FIG. 18. However, detection electrodes 124 shown in FIG. 20 are provided with connection parts 126 for electrically connecting detection electrodes 124. Connection parts 126 may be provided at regular intervals as illustrated in FIG. 20.

As described herein, when the second electrode (detection electrode) electrically working as one electrode is formed of a plurality of electrodes (detection electrodes 123 or detection electrodes 124, for example), connection parts (connection parts 125 or connection parts 126, for example) electrically connecting these plural electrodes (detection electrodes 123 or detection electrodes 124, for example) may be provided.

This structure increases the stability of the electric operation of the detection electrodes and stabilizes touch detection while maintaining the advantage of reducing the visibility of the foregoing wiring patterns of the detection electrodes and interference fringes. For example, the connection parts can secure a conductive path for electric signals at the time of partial disconnection of any detection electrode.

According to the present exemplary embodiment, the detection electrode electrically working as one detection electrode is formed of two pieces of detection electrodes, and a zigzag-shaped slit is formed between the two detection electrodes. Alternatively, the detection electrode electrically working as one detection electrode may be formed of three or more detection electrodes, and two or more zigzag-shaped slits may be formed between the respective detection electrodes. In this case, connection parts for electrically connecting the respective detection electrodes may be formed.

Fourth Exemplary Embodiment

In the first through third exemplary embodiments, the relationship between the relative positions of the slits formed between the floating electrodes is not particularly described. However, it was confirmed that the advantage of reducing the visibility of the foregoing wiring patterns of the detection electrodes and interference fringes further improves when the relationship between the relative positions of the slits is more appropriately determined. According to the present exemplary embodiment, a structure example focused on the relationship between the relative positions of the slits formed between floating electrodes is described with reference to FIGS. 21A, 21B, 22, and 23.

The structure according to the present exemplary embodiment is applicable to the foregoing first through third exemplary embodiments.

[4-1. Configuration]

A display device according to a fourth exemplary embodiment has substantially the same constitution as the constitution of display device 100 shown in the first exemplary embodiment, and thus the details of the constitution of the display device are not repeatedly described herein. In addition, the definitions of the vertical direction and the horizontal direction in the present exemplary embodiment are substantially the same as the definitions of the vertical direction and the horizontal direction shown in the first exemplary embodiment.

[4-2. Operation]

The display device according to the fourth exemplary embodiment performs substantially the same operation as the operation of display device 100 shown in the first exemplary embodiment, and thus the details of the operation of the display device are not repeatedly described herein.

[4-3. Structure]

Positions of slits formed between floating electrodes according to the present exemplary embodiment are hereinafter described with reference to FIGS. 21A, 21B, 22, and 23.

According to the present exemplary embodiment, the respective floating electrodes are disposed in such positions that the following conditions are met. The positions of the respective floating electrodes are determined such that a plurality of successive slits extending in the same direction (slits formed between the floating electrodes) are disposed not on an imaginary line extended in an extension direction of any one of the plurality of slits extending in the same direction, but at positions deviated in parallel to the line.

FIGS. 21A and 21B are plan views schematically illustrating an example of constituent patterns of floating electrodes of the display device according to the fourth exemplary embodiment.

Floating electrodes 131 shown in FIGS. 21A and 21B are substantially similar to floating electrodes 131 shown in the first exemplary embodiment in conjunction with FIG. 9. In addition, conditions required for forming the floating electrodes in the present exemplary embodiment are substantially similar to the corresponding conditions shown in the first exemplary embodiment. The details of the floating electrodes and the forming conditions thereof are therefore not repeatedly described herein. Slits 31 formed between floating electrodes 131 in FIGS. 21A and 21B are substantially similar to the slits formed between floating electrodes 131 shown in the first exemplary embodiment in conjunction with FIG. 9. In addition, conditions required for forming slits 31 in the present exemplary embodiment are substantially similar to the corresponding conditions shown in the first exemplary embodiment. The details of slits 31 and the forming conditions thereof are therefore not repeatedly described herein.

According to the present exemplary embodiment, the positions of respective floating electrodes 131 shown in FIGS. 21A and 21B are determined in the manner as follows.

For example, in the case of the example shown in FIG. 21A, slit 31a formed between floating electrodes 131a and 131b, and slit 31b formed between floating electrodes 131c and 131d are slits successively extending in the same direction. However, slit 31b is not disposed on an imaginary line (indicated by broken lines in FIG. 21A) extended in an extension direction of slit 31a, but at a position deviated in parallel to the line.

FIG. 21B shows an example of the degree of this "deviation" (hereinafter referred to as "deviation amount" as well).

According to the example shown in FIG. 21B, slit 31a formed between floating electrodes 131a and 131b, slit 31b formed between floating electrodes 131c and 131d, slit 31c formed between floating electrodes 131e and 131f, and slit 31d formed between floating electrodes 131g and 131h are slits successively extending in the same direction. However, each of slits 31b, 31c, and 31d is disposed not on an imaginary line (indicated by broken lines in FIG. 21B) extended in an extension direction of slit 31a, but at a position deviated in parallel to the line.

As illustrated in FIG. 21B, respective floating electrodes 131 are disposed such that a side contained in floating electrode 131h and forming slit 31d is positioned on an extension of a side contained in floating electrode 131a and forming slit 31a.

In other words, the plurality of slits successively extending in the same direction are disposed such that two successive slits (such as slits 31a and 31b) are deviated from each other by one third of one slit width, and that two slits (such as slits 31a and 31d) between which two slits (such as slits 31b and 31c) are sandwiched are deviated from each other by one slit width.

Figure 22:
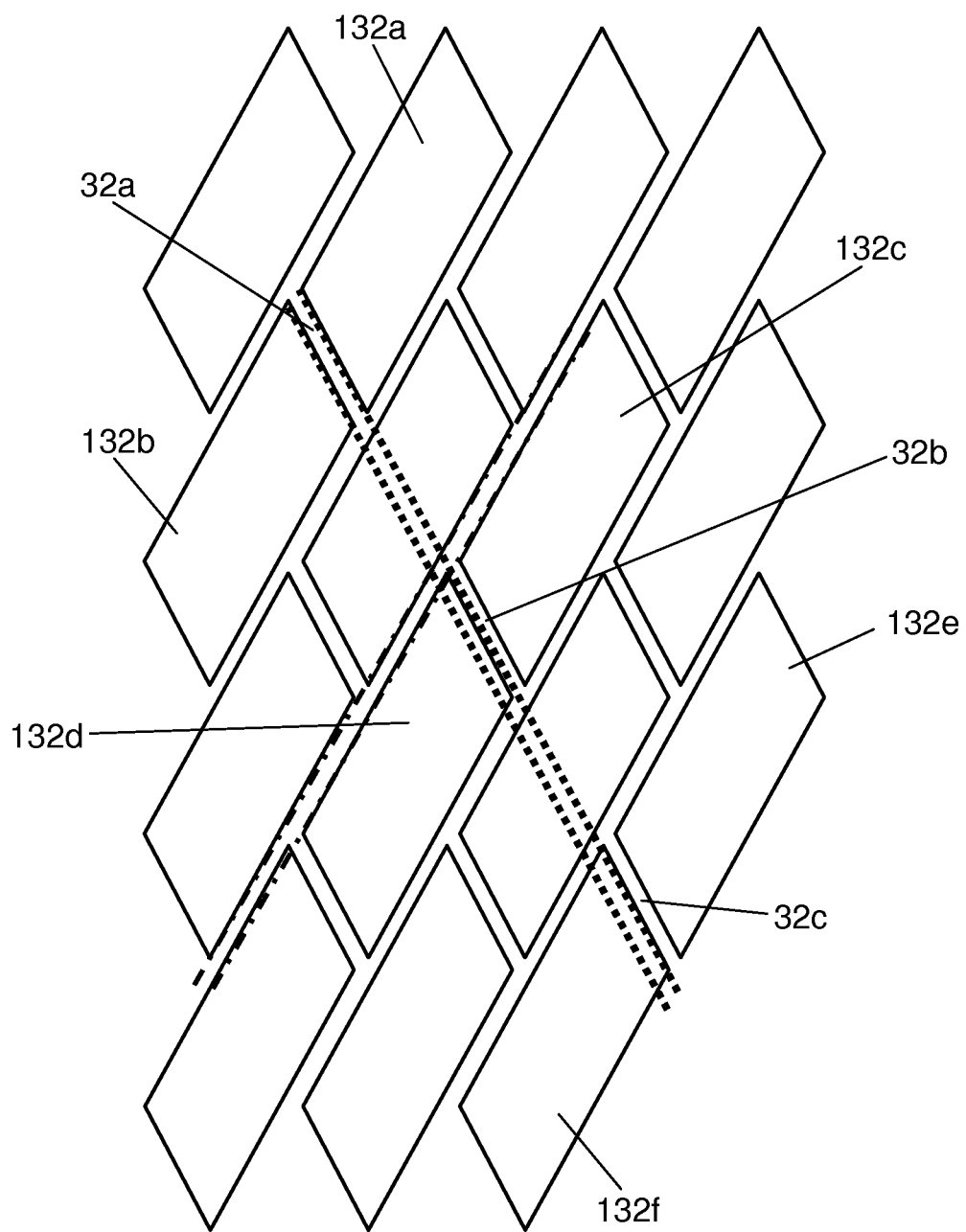
FIG. 22 is a plan view schematically illustrating another example of the constituent patterns of the floating electrodes of the display device according to the fourth exemplary embodiment.

FIG. 22 is a plan view schematically illustrating another example of the constituent patterns of the floating electrodes of the display device according to the fourth exemplary embodiment.

Floating electrodes 132 shown in FIG. 22 are substantially the same as floating electrodes 132 shown in the first exemplary embodiment in conjunction with FIG. 13. Similarly, slits 32 formed between floating electrodes 132 shown in FIG. 22 are substantially the same as the slits formed between floating electrodes 132 shown in the first exemplary embodiment in conjunction with FIG. 13.

According to the example shown in FIG. 22, slit 32a formed between floating electrodes 132a and 132b, slit 32b formed between floating electrodes 132c and 132d, and slit 32c formed between floating electrodes 132e and 132f are successive slits extending in the same direction. However, slits 32b and 32c are disposed not on an imaginary line (indicated by broken lines in FIG. 22) extended in an extension direction of slit 32a, but at positions deviated in parallel to the line.

As illustrated in FIG. 22, respective floating electrodes 132 are disposed such that a side contained in floating electrode 132f and forming slit 32c is located on an extension of a side contained in floating electrode 132a and forming slit 32a.

In other words, the plurality of slits successively extending in the same direction are disposed such that two successive slits (such as slits 32a and 32b) are deviated from each other by half of one slit width, and that two slits (such as slits 32a and 32c) between which one slit (such as slit 32b) is sandwiched are deviated from each other by one slit width.

Figure 23:
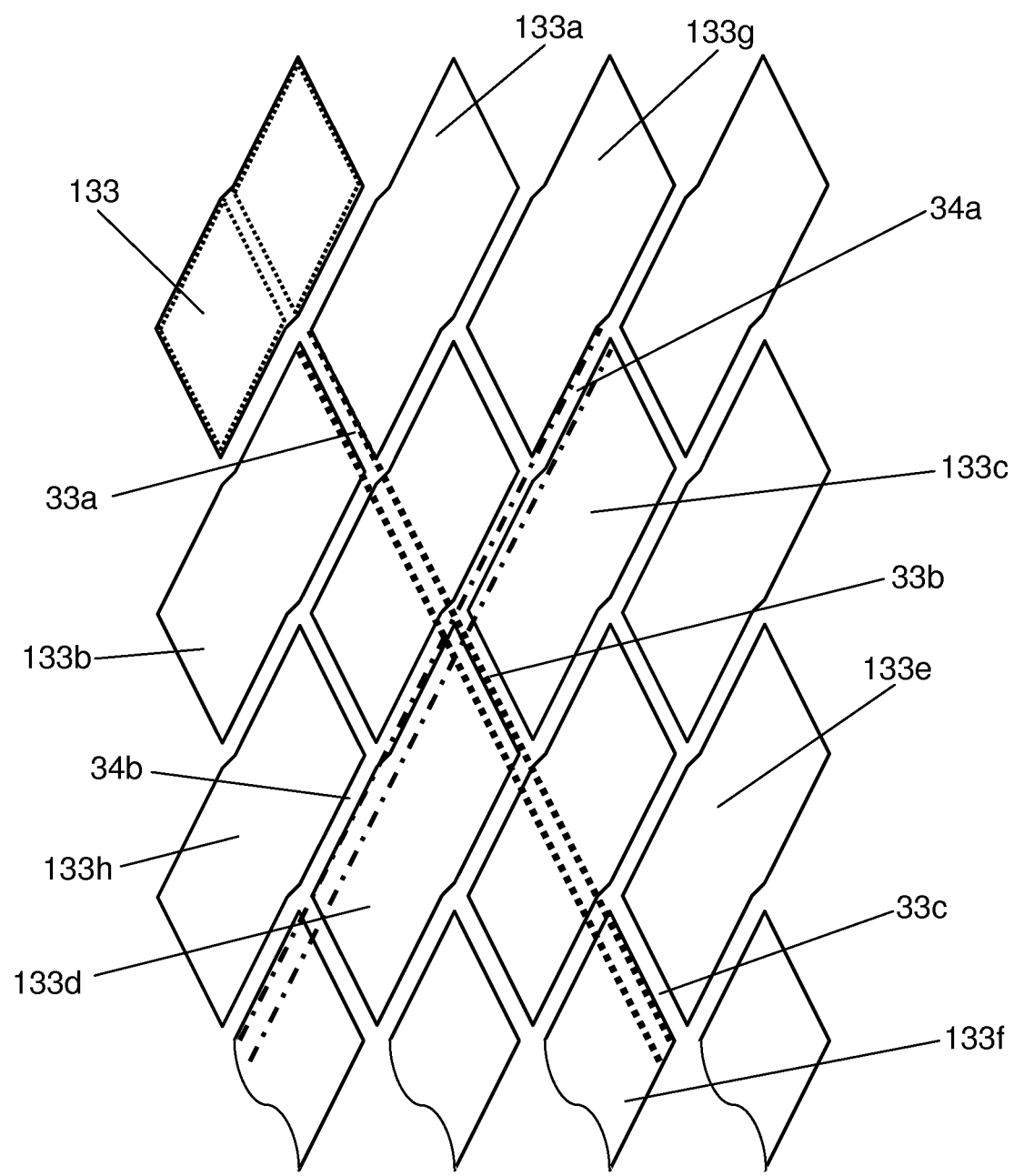
FIG. 23 is a plan view schematically illustrating still another example of the constituent patterns of the floating electrodes of the display device according to the fourth exemplary embodiment.

FIG. 23 is a plan view schematically illustrating still another example of the constituent patterns of floating electrodes of the display device according to the fourth exemplary embodiment.

Each of floating electrodes 133 shown in FIG. 23 is formed by combining two rhombuses (indicated by broken lines in FIG. 23) each having a shape similar to each shape of floating electrodes 131 shown in FIG. 21, and therefore has a deformed shape of the parallelogram forming each shape of floating electrodes 132 shown in FIG. 22.

According to the example shown in FIG. 23, slit 33a formed between floating electrodes 133a and 133b, slit 33b formed between floating electrodes 133c and 133d, and slit 33c formed between floating electrodes 133e and 133f are slits successively extending in the same direction. However, slits 33b and 33c are disposed not on an imaginary line (indicated by broken lines in FIG. 23) extended in an extension direction of slit 33a, but at positions deviated in parallel to the line.

As illustrated in FIG. 23, respective floating electrodes 133 are disposed such that a side contained in floating electrode 133f and forming slit 33c is located on an extension of a side contained in floating electrode 133a and forming slit 33a. In other words, the plurality of slits successively extending in the same direction are disposed such that two successive slits (such as slits 33a and 33b) are deviated from each other by two thirds of one slit width, and that two slits (such as slits 33a and 33c) between which one slit (such as slit 33b) is sandwiched are deviated from each other by four thirds of one slit width.

According to the example shown in FIG. 22, floating electrodes 132c and 132d have sides positioned on the same line as indicated by chain lines in FIG. 22, for example. In this case, a plurality of successive slits extending in the same direction, which direction is different from the extension direction of slits 32, are disposed on an imaginary line extended in an extension direction of any one of the slits extending in the direction different from the extension direction of slits 32.

However, according to the example shown in FIG. 23, a plurality of successive slits 34 extending in the same direction, which direction is different from the extension direction of slits 33, are disposed at positions deviated from an imaginary line extended in an extension direction of any one of slits 34, unlike the example shown in FIG. 22. For example, slit 34a formed between floating electrodes 133c and 133g, and slit 34b formed between floating electrodes 133d and 133h are successive slits extending in the same direction. However, slit 34b is disposed not on an imaginary line extended in an extension direction of slit 34a (indicated by chain lines in FIG. 23), but at a position deviated in parallel to the line.

Deviation amounts of the positions of the respective slits in the present exemplary embodiment are not limited to the deviation amounts shown in FIGS. 21A through 23.

[4-4. Effect]

According to the input device of the present exemplary embodiment described herein, the third electrodes (floating electrodes) are formed such that the others (such as slits 31b, 31c, and 31d) of a plurality of successive slits (such as slits 31) formed between the third electrodes (floating electrodes) and extending in the same direction are disposed at positions deviated in parallel to an imaginary line extended in an extension direction of any one (such as slit 31a) of the plurality of successive slits.

Accordingly, the structure of the present exemplary embodiment further improves the advantage of reducing the visibility of the wiring patterns of the detection electrodes and the interference fringes described in the first exemplary embodiment.

Fifth Exemplary Embodiment

The present exemplary embodiment describes a structure and manufacturing steps of liquid crystal panel 21 included in display device 100. The structure and manufacturing steps of liquid crystal panel 21 shown in the present exemplary embodiment are applicable to the foregoing first through fourth exemplary embodiments.

[5-1. Configuration]

Figure 24:
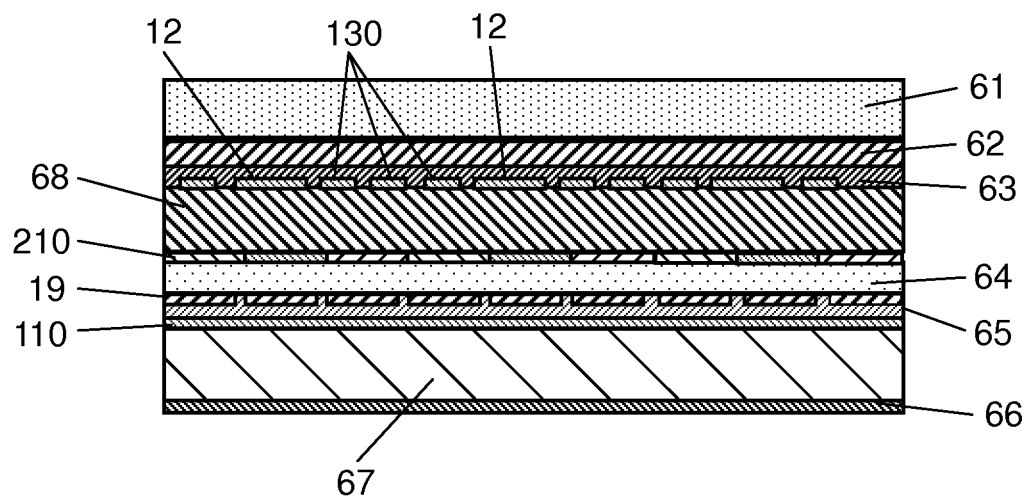
FIG. 24 is a cross-sectional view schematically illustrating an example of a cross-sectional structure of a liquid crystal panel included in a display device according to a fifth exemplary embodiment.

FIG. 24 is a cross-sectional view schematically illustrating an example of a cross-sectional structure of liquid crystal panel 21 included in display device 100 according to the fifth exemplary embodiment.

Liquid crystal panel 21 contains active matrix-type electrode part 65 on TFT substrate 67 side. Active matrix-type electrode part 65 contains common electrode (Vcom electrode) 110 and pixel electrodes 19.

Liquid crystal panel 21 further contains color filters (CF) 210 in R, G, and B colors, a black matrix (BM, not shown), and an over coat (OC) layer (not shown) on color filter (CF) substrate 68 side.

An orientation membrane layer (not shown) is formed on each of inner surfaces (surfaces facing to each other) of TFT substrate 67 and CF substrate 68. Liquid crystal layer 64 is injected between TFT substrate 67 and CF substrate 68.

Liquid cells are formed on liquid crystal panel 21 in this manner. It is assumed herein that each of the liquid crystal cells is constituted by the constituent elements formed in the range from CF substrate 68 to TFT substrate 67.

Upper polarizing plate 63 is disposed on CF substrate 68 (surface on the side opposite to liquid crystal layer 64), while lower polarizing plate 66 is disposed on a surface of TFT substrate 67 on the side opposite to the surface where common electrode 110 is formed. In other words, the liquid crystal cells are sandwiched between upper polarizing plate 63 and lower polarizing plate 66. In addition, cover glass 61 is attached via bonding layer 62 to upper polarizing plate 63 of CF substrate 68. Cover glass 61 has a protection function such as prevention of cracking of liquid crystal panel 21.

In manufacturing liquid crystal panel 21, a transparent electrode (ITO electrode) constituted by ITO is formed on a surface of CF substrate 68 after formation of the liquid crystal cells and before attachment of upper polarizing plate 63 to CF substrate 68. The formed ITO electrode is pattered to produce desired patterns by using photolithography, for example, thereby forming detection electrodes 12 and floating electrodes 130.

As a result, a plurality of detection electrodes 12 are formed on a display surface side of CF substrate 68 substantially at uniform intervals, and a plurality of floating electrodes 130 are formed between a plurality of detection electrodes 12.

[5-2. Operation]

Display device 100 according to the fifth exemplary embodiment performs substantially the same operation as the operation of display device 100 shown in the first exemplary embodiment. The details of the operation are therefore not repeated herein.

[5-3. Effect]

As described above, according to the input device of the present exemplary embodiment, second electrodes (detection electrodes) and third electrodes (floating electrodes) are made of substantially the same material, and disposed substantially on the same layer (such as the surface of CF substrate 68).

In this case, the second electrodes (detection electrodes) and the third electrodes (floating electrodes) are made of substantially the same material, and formed by the same steps at the manufacture of the liquid crystal panel. Accordingly, the structure of the present exemplary embodiment adjusts the light reflectance and transmittance of the second electrodes (detection electrodes) and the light reflectance and transmittance of the third electrodes (floating electrodes) to substantially equivalent values.

More specifically, according to the input device of the present exemplary embodiment, the plurality of floating electrodes made of substantially the same material as the material of the detection electrodes are disposed between the detection electrodes. In this case, the light reflectance and transmittance of the area including the detection electrodes and the light reflectance and transmittance of the area not including the detection electrodes are equalized. Accordingly, the visibility of the wiring patterns of detection electrodes 12 further decreases.

In manufacturing a liquid crystal panel for products, such as a smart phone and a tablet computer, desired to be lightweight, TFT substrate 67 and CF substrate 68 are chemical polished to reduce the weights of TFT substrate 67 and CF substrate 68 after the formation of a liquid crystal cells in a certain case. According to this method, an ITO electrode is formed on a surface of CF substrate 68 after reduction of the weight, and then the respective electrode patterns are formed. At the time of formation of the ITO electrode, the liquid crystal cells are generally heated only to approximately 100° C. due to the limitation of a generally low heat resistant temperature of this liquid crystal cells. Accordingly, amorphous ITO is formed as the ITO electrode.

As described in the first exemplary embodiment, amorphous ITO has a high sheet resistance than the sheet resistance of crystalline ITO electrode formed at a high temperature. Accordingly, the thickness of the ITO electrode needs to be increased to reduce the resistance of transparent electrode constituted by amorphous ITO. In addition, the light transmittance of amorphous ITO is lower than the light transmittance of crystalline ITO electrode. Thus, the light transmittance further lowers when the thickness of ITO electrode is increased.

Accordingly, when detection electrodes are produced from amorphous ITO, the difference in the light transmittance increases between the area including detection electrodes and the area not including detection electrodes. In this case, visibility of wiring patterns of detection electrodes increases. According to the present exemplary embodiment, however, detection electrodes 12 and floating electrodes 130 are made of the same material and formed on the same layer on CF substrate 68 (such as a surface of CF substrate 68). In this case, the light reflectance and transmittance become substantially equivalent. Accordingly, the structure of the present exemplary embodiment can reduce the visibility of the wiring patterns of detection electrodes 12 even in the case of a liquid crystal panel formed by a process which is difficult for the electrode to be formed at a high temperature.

According to the present exemplary embodiment, the example of the in-cell touch panel has been described in conjunction with the cross-sectional view of this panel. However, the present exemplary embodiment is not limited to of in-cell type, but may be applied to an out-cell touch panel. According to the out-cell touch panel, a touch panel including detection electrodes and floating electrodes on a glass substrate or on a resin sheet is disposed on a display device in such a position as to face to pixels. In the case of the out-cell type, air gap is formed between the touch panel and the display device, or the touch panel and the display device are affixed to each other via a bonding layer. In this case, the distance between the pixels and the detection electrodes increases in comparison with the in-cell type where detection electrodes are formed on a surface of a CF substrate. Accordingly, fringe patterns produced by wiring patterns of the detection electrodes and interference fringes between CF and BM relatively decrease. In addition, in the case of the out-cell type, a heat resistant temperature of the glass substrate formed with the electrode is relatively high at the time of formation of ITO, and thus the heating temperature is allowed to be raised to a relatively high temperature. In this case, crystallized and low-resistant ITO electrode is allowed to be manufactured. Accordingly, the structure shown in the present disclosure is more advantageous when applied to an in-cell touch panel.

Other Exemplary Embodiments

The first through fifth exemplary embodiments have been described herein as examples of the technology disclosed in the present application. However, the technology according to the present disclosure is not limited to these exemplary embodiments, but may be applied to exemplary embodiments including modifications, replacements, additions, omissions and the like. In addition, the respective constituent elements shown in the foregoing first through fifth exemplary embodiments may be combined to produce different exemplary embodiments.

Other exemplary embodiments are hereinafter described.

Arrangement patterns of detection electrodes and floating electrodes are not limited to the arrangement patterns of the structure examples shown in the respective exemplary embodiments, but may be such arrangement patterns as combinations of the structure examples shown in the respective exemplary embodiments.

Figure 25:
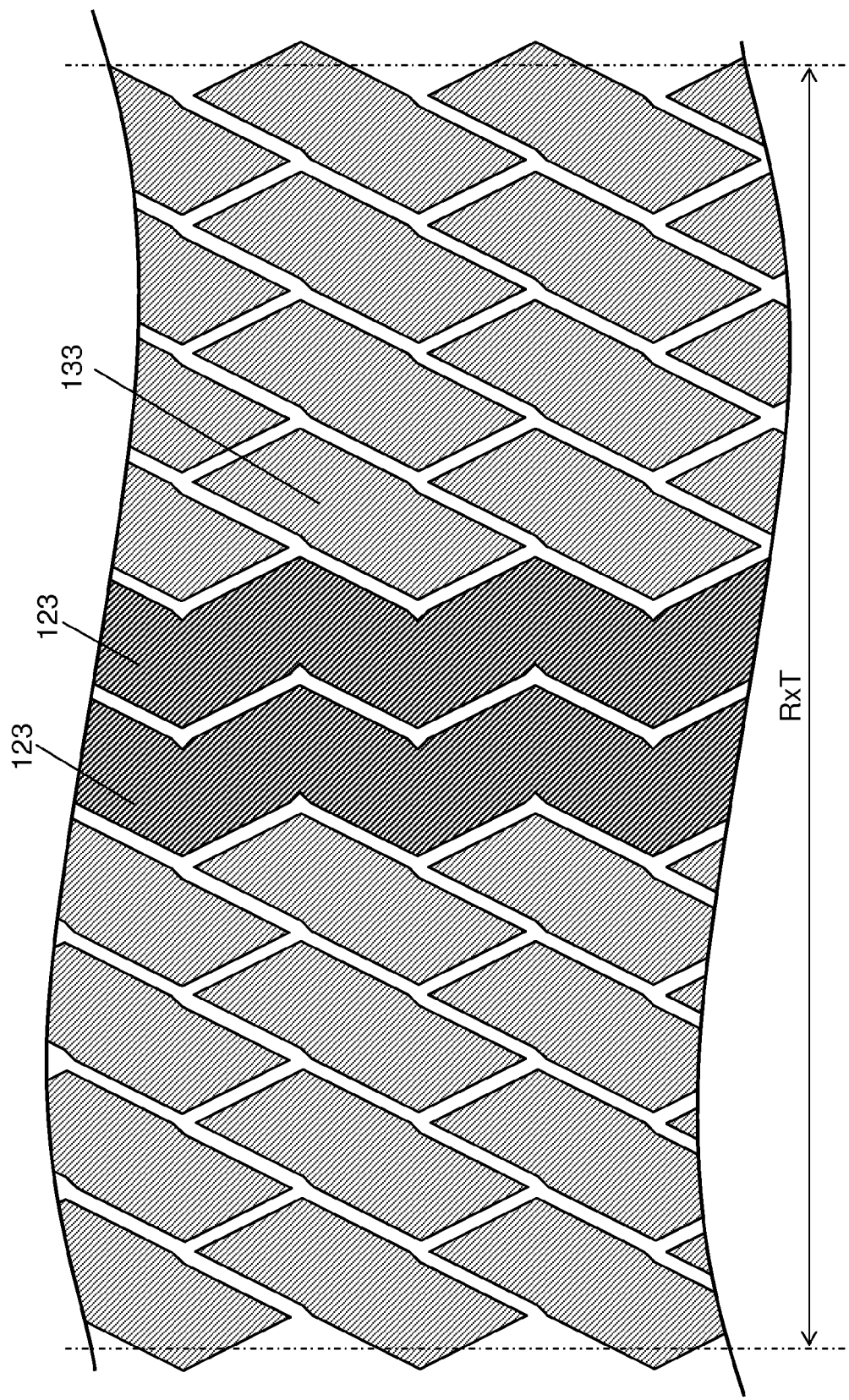
FIG. 25 is a plan view schematically illustrating an example of constituent patterns of detection electrodes and floating electrodes of a display device according to another exemplary embodiment.

FIG. 25 is a plan view schematically illustrating an example of constituent patterns of detection electrodes and floating electrodes of a display device according to another exemplary embodiment.

FIG. 25 shows a structure example including a combination of the structure example shown in FIG. 23 and the structure example shown in FIG. 18. As in this case, for example, the structure examples shown in the respective exemplary embodiments may be combined.

According to these exemplary embodiments, sensor control circuit 13 controls sensor driving circuit 26 and signal detecting circuit 27 in accordance with timing signals 1 and 2 output from signal control device 28. However, signal control device 28 may be configured to directly control sensor driving circuit 26 and signal detecting circuit 27.

The floating electrodes are not required to have the shapes and sizes shown in the respective exemplary embodiments in conjunction with the figures. The shapes of the floating electrodes may be arbitrarily determined within the range of the conditions disclosed as to the slits.

According to the first through fifth exemplary embodiments, signal detecting circuit 27 includes detecting circuits, one for each of detection electrodes 12. However, signal detecting circuit 27 may include detecting circuits, one for a group of detection electrodes 12. In this case, as for the pulse voltage applied a plurality of times to driving electrodes 11, the plurality of detection electrodes 12 monitor detection signal Rxv by time-sharing to detect detection signal Rxv.

The numerical values shown in the foregoing exemplary embodiments, such as the values indicating the size of the floating electrodes, are presented by way of example only. The scope of the present disclosure is not limited at all to these numerical values.

The present disclosure is applicable to a capacitive coupling type input device. More specifically, the present disclosure is applicable to a liquid crystal television set or liquid crystal display provided with a touch panel, a display-integrated computer or input terminal, a tablet-type device, a smartphone, various types of household electric appliances provided with a touch panel, and others. The present disclosure is applicable to various types of electric devices including a touch panel and a display device combined into one body.

What is claimed is:

1. An input device which is included in a display device including a plurality of pixels, and is configured to detect a contact position of a user, the input device comprising:
   a plurality of first electrodes;
   a plurality of second electrodes disposed so as to cross the first electrodes; and
   a plurality of third electrodes disposed between the second electrodes,
   wherein slits extending obliquely with respect to an extension direction of the second electrodes are formed between the third electrodes, and
   the slits are formed to extend in two directions substantially line-symmetric with respect to the extension direction of the second electrodes.

2. The input device according to claim 1, wherein each of the third electrodes has a rhombic shape.

3. The input device according to claim 1, wherein each of the third electrodes has a parallelogrammatic shape.

4. The input device according to claim 1, wherein the slits are formed at an angle ranging from 13.6 degrees to 64.1 degrees inclusive with respect to the extension direction of the second electrodes.

5. The input device according to claim 1, wherein sides of the second electrodes have zigzag shapes in accordance with shapes and arrangement positions of the third electrodes.

6. The input device according to claim 1, wherein each of the second electrodes electrically working as one electrode is formed of a plurality of electrodes.

7. The input device according to claim 6, wherein a slit formed between the plurality of the electrodes forming each of the second electrodes has a zigzag shape in accordance with zigzag-shaped slits formed between the second electrodes and the third electrodes.

8. The input device according to claim 6, wherein each of the plurality of the electrodes forming each of the second electrodes is formed to have an electrode width substantially equivalent to each width of the third electrodes.

9. The input device according to claim 6, comprising a connection part electrically connecting the plurality of the electrodes, forming each of the second electrodes, to each other.

10. The input device according to claim 1, wherein, assuming an imaginary line extended in an extension direction of any one of a plurality of successive slits included in the slits formed between the third electrodes and extending in the same direction, the third electrodes are formed such that the others of the plurality of the successive slits are disposed at positions deviated in parallel to the imaginary line.

11. The input device according to claim 1, wherein the second electrodes and the third electrodes are made of substantially the same material and disposed substantially on the same layer.

12. The input device according to claim 11, wherein the second electrodes and the third electrodes are disposed substantially on the same layer of a color filter substrate.

13. The input device according to claim 1, wherein the third electrodes are floating electrodes.

14. A display device comprising:
   a display unit including a plurality of pixels; and
   an input device configured to detect a contact position of a user on the display unit,
   wherein the input device includes:
      a plurality of first electrodes;
      a plurality of second electrodes disposed so as to cross the first electrodes; and
      a plurality of third electrodes disposed between the second electrodes, and
   wherein slits extending obliquely with respect to an extension direction of the second electrodes are formed between the third electrodes, and
   the slits are formed to extend in two directions substantially line-symmetric with respect to the extension direction of the second electrodes.

15. The display device according to claim 14, wherein the third electrodes are floating electrodes.

* * * * *